United States Patent
Jiang et al.

(10) Patent No.: US 12,197,425 B2
(45) Date of Patent: Jan. 14, 2025

(54) DATABASE SYSTEM, AND TRANSACTION MANAGEMENT METHOD AND APPARATUS

(71) Applicant: HUAWEI TECHNOLOGIES CO., LTD., Guangdong (CN)

(72) Inventors: Jiangjun Jiang, Beijing (CN); Jiang Wang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 37 days.

(21) Appl. No.: 18/146,947

(22) Filed: Dec. 27, 2022

(65) Prior Publication Data

US 2023/0136417 A1 May 4, 2023

Related U.S. Application Data

(63) Continuation of application No. PCT/CN2021/099688, filed on Jun. 11, 2021.

(30) Foreign Application Priority Data

Jun. 29, 2020 (CN) .......................... 202010602963.4

(51) Int. Cl.
 *G06F 16/23* (2019.01)
(52) U.S. Cl.
 CPC ...... *G06F 16/2379* (2019.01); *G06F 16/2343* (2019.01)
(58) Field of Classification Search
 CPC ............. G06F 16/2379; G06F 16/2343; G06F 16/2308; G06F 16/27; G06F 16/2455
 See application file for complete search history.

(56) References Cited

U.S. PATENT DOCUMENTS 9,779,128 B2 * 10/2017 Cai ..................... G06F 11/1474
2019/0171763 A1 * 6/2019 Cai ....................... G06F 16/278

FOREIGN PATENT DOCUMENTS

CN          110196760 B     4/2023

OTHER PUBLICATIONS

Frank et al. Semantic ACID Properties in multidatabases Using Remote Procedure Calls and Update, Software-Practice and Experience, vol. 28(1), 77-98 (Jan. 1998) Propagations (Year: 1998).*

(Continued)

*Primary Examiner* — Cheyne D Ly
(74) *Attorney, Agent, or Firm* — WOMBLE BOND DICKINSON (US) LLP

(57) ABSTRACT

A database system is provided, including a first global transaction manager (GTM), a first data node) DN, and a coordinator node (CN). The CN is configured to send a query to the first DN. The first DN is configured to, in response to the query, determine a target commit sequence number (CSN), determine a committed transaction on the first DN based on the target CSN, and determine a query result corresponding to the query based on the committed transaction. The target CSN is allocated by the first GTM. The target CSN is used to distinguish between the committed transaction and an active transaction on the first DN. The active transaction is a transaction that is being executed. In addition, a corresponding transaction management method is provided. The CSN is used to replace an active transaction linked list. This reduces network traffic and improves concurrency and scalability of the database system.

16 Claims, 14 Drawing Sheets

(56) References Cited

OTHER PUBLICATIONS

Mehrota et al., A Transaction Model for Multidatabase Systems, IEEE, pp. 56-63. (Year: 1992).*

Segun et al., A Transaction Processing Model for the Mobile Data Access System, V. Malyshkin (Ed.): PaCT 2001, LNCS 2127, pp. 112â127, 2001 (Year: 2001).*

Chen et al., Data Management at Huawei: Recent Accomplishments and Future Challenges, 2019 IEEE 35th International Conference on Data Engineering (ICDE) Apr. 8-11, 2019, pp. 13-24. (Year: 2019).*

* cited by examiner

DATABASE SYSTEM, AND TRANSACTION MANAGEMENT METHOD AND APPARATUS

CROSS-REFERENCE TO RELATED APPLICATIONS

This application is a continuation of International Application No. PCT/CN2021/099688, filed on Jun. 11, 2021, which claims priority to Chinese Patent Application No. 202010602963.4, filed on Jun. 29, 2020. The disclosures of the aforementioned applications are hereby incorporated by reference in their entireties.

TECHNICAL FIELD

This application relates to the field of database technologies, and specifically, to a database system, and a transaction management method and apparatus.

BACKGROUND

A database system (DB) provides atomicity (A), consistency (C), isolation (I), and durability (D), that is, ACID, for a client service according to a transaction processing mechanism. A transaction of the database system is a database operation sequence, and includes all database operations executed between a start of the transaction and an end of the transaction. These operations are either all executed or none is executed, and are an inseparable unit of working. This characteristic of a transaction also reflects the atomicity (A) of the transaction.

In a transaction processing process of the database system, to implement concurrency control between transactions, a global transaction manager (GTM) is usually used to identify and sort transactions. All active transactions are recorded in a slot registration manner on the GTM. An active transaction refers to a transaction that is being executed by a data node (DN). In a process in which the database system provides a service for the client, after receiving a request (for example, a query) sent by the client, a coordinator node (CN) applies to the GTM for a snapshot of each registered slot by using a lock, to obtain an active transaction linked list. The active transaction linked list includes all active transactions. Then, the CN sends the active transaction linked list to the DN, and the DN may compare the active transaction linked list with a local transaction, to determine a committed transaction in the DN.

The lock cannot be used by other transactions at the same time. When there are a large quantity of concurrent transactions, a lock conflict occurs. If the lock is used to obtain the active transaction linked list from the registered slot, concurrency is greatly affected. In addition, the GTM manages all active transactions, and the generated active transaction linked list has a large amount of content. This consumes a large amount of network traffic and restricts concurrency and scalability of the database system.

SUMMARY

Embodiments of this application provide a database system and a transaction management method, to reduce network traffic and improve concurrency and scalability of the database system. Embodiments of this application further provide a corresponding apparatus.

A first aspect of this application provides a database system, including a first global transaction manager (GTM), a first data node (DN), and a coordinator node (CN). The CN is configured to send a query to the first DN. The first DN is configured to: in response to the query, determine a target commit sequence number (CSN), determine a committed transaction on the first DN based on the target CSN, and determine, based on the committed transaction, a query result corresponding to the query. The target CSN is allocated by the first GTM. The target CSN is used to distinguish between the committed transaction and an active transaction on the first DN. The active transaction is a transaction that is being executed.

In the first aspect, the database system may be a distributed database system (DDBS). The database system may include one or more DNs and one or more CNs. If the database system includes two GTMs, the first GTM is a primary GTM, and the other GTM is a secondary GTM. A transaction of the database is a database operation sequence, which includes all operations performed between a start of the transaction (e.g., begin) and an end of the transaction (e.g., commit). These operations are either all executed or none is executed. The transaction of the database is an inseparable unit of work. The commit of the transaction means that the transaction is committed to a data memory for storage after being executed. The CSN is a global sequence number allocated by the first GTM after the transaction is committed. In the entire database system, each committed transaction has a unique CSN. The target CSN is a latest CSN allocated by the first GTM or a latest CSN allocated by the first DN. When the query is received, the CSN of each committed transaction is smaller than the target CSN. Certainly, the CSN of each committed transaction may be greater than the target CSN. Therefore, the committed transaction on the first DN may be determined by comparing CSNs. The query refers to a query operation. There is a mapping relationship between a local transaction identifier and the CSN on the first DN. The local transaction identifier of the committed transaction may be found based on the CSN. Data stored in the first DN records a corresponding local transaction identifier. In this way, data may be scanned based on the local transaction identifier of the committed transaction, to obtain the query result. The query result is data corresponding to the query. Compared with that the first GTM determines an active transaction linked list by using a lock, the first GTM, the CN, and the first DN send the active transaction linked list to each other, and the first DN determines the committed transaction by using the active transaction linked list. According to the solution provided in the first aspect, the first GTM only needs to maintain a globally latest CSN. This not only avoids a lock conflict, but also reduces a calculation amount of searching for a large quantity of active transactions by the first GTM. This helps the first GTM access more requests, and provides a processing capability of the first GTM. Only one CSN needs to be sent between the first GTM, the CN, and the first DN, so that network traffic can be reduced. The first DN may determine the committed transaction by comparing sizes of CSNs, so that a calculation amount of the first DN can be reduced. It can be learned that the solution provided in the first aspect helps improve concurrency and scalability of the database system.

In a possible embodiment of the first aspect, the CN is configured to: receive a message that is sent by the first DN and that indicates that a target transaction is successfully committed, and in response to the message, send a transaction commit notification to the first GTM. The transaction commit notification indicates that the target transaction has been committed. The first GTM is configured to: allocate a first global CSN to the target transaction based on the transaction commit notification, and send a CSN of the target transaction to the CN. The CN is configured to send the CSN of the target transaction to the first DN. The first DN is configured to store a mapping relationship between the CSN of the target transaction and a first identifier. The first identifier is a local transaction identifier of the target transaction on the first DN.

In this possible embodiment, both the message indicating that the target transaction is successfully committed and the transaction commit notification indicate that the transaction is successfully committed, and the two may be a same message. Alternatively, the transaction commit notification may be obtained by the CN based on the message indicating that the target transaction is successfully committed. After the target transaction is committed, the first GTM allocates the first global CSN to the target transaction. The first DN generates the local transaction identifier for a locally committed target transaction, and then stores the mapping relationship between the local transaction identifier of the target transaction and the CSN of the target transaction. In this way, the local transaction identifier of the target transaction on the first DN can be determined based on the CSN of the target transaction and the mapping relationship, and the target transaction can be found. In this possible embodiment, compared with a case in which the first GTM allocates one transaction identifier to each transaction and the first DN generates the local transaction identifier for the transaction, load of the first GTM is reduced, and network traffic generated for transferring the transaction identifier between the first GTM, the CN, and the first DN is reduced. This improves a throughput of the database system.

In a possible embodiment of the first aspect, the database system further includes a second DN. The target transaction is jointly executed by the first DN and the second DN. The CN is configured to send a global identifier of the target transaction to the first DN. The global identifier includes an identifier of the second DN and a second identifier. The second identifier is a local transaction identifier of the target transaction on the second DN. The first DN is configured to determine, based on the global identifier, the second DN that jointly executes the target transaction.

In this possible embodiment, a target transaction end message may be triggered by a client, or may be triggered by the CN. In response to the target transaction end message, the CN determines whether the target transaction is executed by one DN or a plurality of DNs. The "plurality of" here includes at least two. If the transaction is executed by the plurality of DNs, it indicates that the transaction is a distributed transaction. Considering that fault recovery needs to be performed when the database system is faulty, a same transaction distributed on different DNs needs to be found. Therefore, the CN delivers a global identifier (GID) to the DN that executes the target transaction. In this way, the plurality of DNs can accurately find all participating DNs of the distributed transaction based on the GID. For different DNs that execute a same transaction, the CN delivers different GIDs. For example, the target transaction is jointly executed by the first DN and the second DN. In this case, a GID1 delivered by the CN to the first DN includes the identifier of the second DN and the second identifier, and a GID2 delivered by the CN to the second DN includes an identifier of the first DN and the first identifier. In this way, when a fault occurs, the first DN may find the second DN for the target transaction by using the GID1, or the second DN may find the first DN for the target transaction by using the GID2, to recover the target transaction when the fault occurs.

In a possible embodiment of the first aspect, the CN is further configured to: before sending the query to the first DN, determine that the query is related to at least two DNs including the first DN; send a snapshot request to the first GTM; receive the target CSN sent by the first GTM, where the target CSN is a second global CSN allocated by the first GTM when the first GTM receives the snapshot request; and send the target CSN to the first DN.

In this possible embodiment, after receiving the query, the CN first determines whether the query is related to one DN or the plurality of DNs. If the plurality of DNs are related, the CN requests, from the first GTM, the second global CSN currently allocated by the first GTM, that is, the target CSN. Then, the CN encapsulates the target CSN and the query into a first request and sends the first request to the first DN. The first DN parses the first request to obtain the target CSN from the first request. Certainly, the CN may also separately send the query and the target CSN.

In a possible embodiment of the first aspect, the CN is further configured to: before sending the query to the first DN, determine that the query is related to only the first DN, and send a single-node identifier to the first DN. The first DN is configured to obtain the target CSN from a local cache of the first DN based on the single-node identifier. The target CSN is a CSN allocated by the first GTM to a latest transaction committed by the first DN.

In this possible embodiment, after receiving the query, the CN first determines whether the query is related to one DN or the plurality of DNs. If one DN is related, the CN may directly send the first request to the first DN. The first request only needs to carry one single-node identifier. Certainly, the first request may not be encapsulated into the first request, and the query and the single-node identifier may be separately sent. The single-node identifier indicates that the query is related to only the first DN. The first DN may use, based on the single-node identifier, the CSN of the latest locally committed transaction as the target CSN. Because the query is related to only the first DN, a searching process of the foregoing committed transaction may also be implemented by using the CSN last obtained on the DN, and a globally latest CSN does not need to be obtained from the first GTM. In this way, network traffic generated when the CN requests the target CSN from the first GTM is further reduced.

In a possible embodiment of the first aspect, that the first DN is configured to determine a committed transaction based on the target CSN includes: The first DN is configured to determine that a transaction whose CSN is not greater than the target CSN is the committed transaction; or the first DN is configured to determine that a transaction whose CSN is not less than the target CSN is the committed transaction.

In this possible embodiment, if the query is related to the plurality of DNS, the target CSN is a globally largest CSN or a globally smallest CSN allocated by the first GTM. If the query is related to one DN, the target CSN is a locally largest CSN or a locally smallest CSN allocated by the first DN. Therefore, the committed transaction may be determined by comparing sizes. This comparison manner can improve a speed of searching for the committed transaction.

In a possible embodiment of the first aspect, the database system further includes a second GTM. The second GTM is configured to back up data of the first GTM. The first GTM is configured to: when sending the CSN of the target transaction to the CN, send a third global CSN to the second GTM by using an asynchronous thread. The third global CSN is obtained by the first GTM by incrementing or decrementing the first global CSN.

In this possible embodiment, a latest global CSN allocated by the first GTM, that is, the third global CSN, is sent to the second GTM by using the asynchronous thread, so that reliability of the database system can be ensured. The third global CSN is obtained by incrementing or decrementing the first global CSN. Generally, the CSN is incremented. Certainly, the CSN may also be decremented, or obtained in another CSN update manner. The increment is used as an example. An operation of increment is usually 1, and certainly may also be 2 or another value. For example, the operation of increment is 1. If the first global CSN is 0000005, the third global CSN is 0000006.

In a possible embodiment of the first aspect, the CN is configured to: determine a global clean value, where the global clean value is a smallest CSN in CSNs held by all DNs; and send the global clean value to the first DN, where the global clean value is used by the first DN to clean dirty data. It should be noted that when the first GTM maintains the CSN by decrementing the CSN, the global clean value is a largest CSN in the CSNs held by all the DNS.

In this possible embodiment, the first GTM does not need to participate in data cleaning. The CN initiates collection of the global clean value. The CN indicates the first DN to periodically clean the dirty data based on the global clean value. The dirty data may be understood as historical data of a modified transaction ID, and is invisible to the client. In this dirty data cleaning solution, load of the first GTM can be reduced, and performance of the first GTM can be improved.

A second aspect of this application provides a transaction management method, where the method includes: A first data node DN in a database system receives a query sent by a coordinator node CN in the database system. In response to the query, the first DN determines a target commit sequence number CSN. The target CSN is allocated by a first global transaction manager GTM in the database system. The target CSN is used to distinguish between a committed transaction and an active transaction on the first DN. The active transaction is a transaction that is being executed. The first DN determines the committed transaction on the first DN based on the target CSN, and determines, based on the committed transaction, a query result corresponding to the query.

In the second aspect, based on the database system described in the first aspect, the first DN may determine the committed transaction on the first DN by comparing CSNs. Compared with determining the committed transaction by the first DN by using an active transaction linked list, a calculation amount of the first DN can be reduced. This helps improve concurrency and scalability of the database system.

In a possible embodiment of the second aspect, the method further includes: The first DN receives a CSN that is of a target transaction and that is sent by the CN. The first DN stores a mapping relationship between the CSN of the target transaction and a first identifier. The first identifier is a local transaction identifier of the target transaction on the first DN.

In this possible embodiment, after the target transaction is committed, the first GTM allocates a latest global CSN to the target transaction. The first DN generates a local transaction identifier for a locally committed target transaction, and then stores a mapping relationship between the local transaction identifier of the target transaction and the CSN of the target transaction. In this way, the local transaction identifier of the target transaction on the first DN can be determined based on the CSN of the target transaction and the mapping relationship. Data corresponding to the query is determined based on the local transaction identifier of data stored in the first DN. In this possible embodiment, compared with a case in which the first GTM allocates one transaction identifier to each transaction and the first DN generates the local transaction identifier for the transaction, load of the first GTM is reduced, and network traffic generated for transferring the transaction identifier between the first GTM, the CN, and the first DN is reduced. This improves a throughput of the database system.

In a possible embodiment of the second aspect, the database system further includes a second DN. The target transaction is jointly executed by the first DN and the second DN. The first DN may receive, before receiving the CSN that is of the target transaction and that is sent by the CN, a global identifier that is of the target transaction and that is sent by the CN. The global identifier includes an identifier of the second DN and a second identifier. The second identifier is a local transaction identifier of the target transaction on the second DN. The first DN determines, based on the global identifier, the second DN that jointly executes the target transaction.

In this possible embodiment, for example, the target transaction is jointly executed by the first DN and the second DN. In this case, a GID1 delivered by the CN to the first DN includes the identifier of the second DN and the second identifier, and a GID2 delivered by the CN to the second DN includes an identifier of the first DN and the first identifier. In this way, when a fault occurs, the first DN may find the second DN for the target transaction by using the GID1, or the second DN may find the first DN for the target transaction by using the GID2, to recover the target transaction when the fault occurs.

In a possible embodiment of the second aspect, the query is related to at least two DNs including the first DN, and the method further includes: The first DN receives the target CSN sent by the CN. Th target CSN is a second global CSN allocated by the first GTM when the first GTM receives the snapshot request.

In this possible embodiment, when the query is related to the at least two DNs, the committed transaction needs to be determined by using the global CSN allocated by the first GTM as the target CSN.

In a possible embodiment of the second aspect, the query is related to only the first DN, and the method further includes: The first DN receives a single-node identifier sent by the CN. That the first DN determines the committed transaction based on the target CSN includes: The first DN obtains the target CSN from a local cache of the first DN based on the single-node identifier. The target CSN is a CSN allocated by the first GTM to a latest transaction committed by the first DN.

In this possible embodiment, because the query is related to only the first DN, a searching process of the foregoing committed transaction may also be implemented by using the CSN last obtained on the first DN, and a globally latest CSN does not need to be obtained from the first GTM. In this way, network traffic generated when the CN requests the target CSN from the first GTM is further reduced.

In a possible embodiment of the second aspect, that the first DN determines the committed transaction based on the target CSN includes: The first DN determines that a transaction whose CSN is not greater than the target CSN is the committed transaction. Alternatively, the first DN determines that a transaction whose CSN is not less than the target CSN is the committed transaction.

In this possible embodiment, if the query is related to the plurality of DNS, the target CSN is a globally largest CSN or a globally smallest CSN allocated by the first GTM. If the query is related to one DN, the target CSN is a locally largest CSN or a locally smallest CSN allocated by the first DN. Therefore, the committed transaction may be determined by comparing sizes. This comparison manner can improve a speed of searching for the committed transaction.

In a possible embodiment of the second aspect, the first DN sends, to the CN, a smallest CSN held by the first DN. The smallest CSN is used by the CN to determine a global clean value. The global clean value is a smallest CSN in CSNs held by all the DNs. The first DN receives the global clean value sent by the CN, and cleans up dirty data based on the global clean value. It should be noted that when the first GTM maintains the CSN by decrementing the CSN, the global clean value is a largest CSN in the CSNs held by all the DNS.

In this possible embodiment, the first GTM does not need to participate in data cleaning. The CN initiates collection of the global clean value. The CN indicates the first DN to periodically clean the dirty data based on the global clean value. The dirty data may be understood as historical data of a modified transaction ID, and is invisible to the client. In this dirty data cleaning solution, load of the first GTM can be reduced, and performance of the first GTM can be improved.

A third aspect of this application provides a transaction management method. The method includes: A first global transaction manager GTM in a database system receives a snapshot request sent by a coordinator node CN in the database system. The first GTM sends a target commit sequence number CSN to the CN based on the snapshot request. The target CSN is a second global CSN allocated by the first GTM when the first GTM receives the snapshot request. The target CSN is used by a first data node DN in the database system to determine a committed transaction on the first DN.

In the third aspect, based on the database system described in the first aspect, the first GTM only needs to maintain a globally latest CSN. This not only avoids a lock conflict, but also reduces a calculation amount of searching for a large quantity of active transactions by the first GTM. This helps the first GTM access more requests. In addition, only one CSN needs to be sent between the first GTM, the CN, and the first DN, so that network traffic can be reduced. It can be learned that the solution provided in the third aspect helps improve concurrency and scalability of the database system.

In a possible embodiment of the third aspect, the method further includes: The first GTM receives a transaction commit notification sent by the CN. The transaction commit notification indicates that a target transaction has been committed. The first GTM allocates a first global CSN to the target transaction based on the transaction commit notification, and sends a CSN of the target transaction to the CN.

In a possible embodiment of the third aspect, the database system further includes a second GTM. The second GTM is configured to back up data of the first GTM. When the first GTM sends the CSN of the target transaction to the CN, the first GTM sends a third global CSN to the second GTM by using an asynchronous thread. The third global CSN is obtained by the first GTM by incrementing or decrementing the first global CSN.

In this possible embodiment, a latest global CSN allocated by the first GTM, that is, the third global CSN, is sent to the second GTM by using the asynchronous thread, so that reliability of the database system can be ensured. The third global CSN is obtained by incrementing or decrementing the first global CSN. Generally, the CSN is incremented. Certainly, the CSN may also be decremented, or obtained in another CSN update manner. The increment is used as an example. A operation of increment is usually 1, and certainly may also be 2 or another value. For example, the operation of increment is 1. If the first global CSN is 0000005, the third global CSN is 0000006.

A fourth aspect of this application provides a transaction management method, including: A coordinator node CN in a database system sends a snapshot request to a first global transaction manager GTM in the database system. The CN receives a target commit sequence number CSN sent by the first GTM. The target CSN is a second global CSN allocated by the first GTM when the first GTM receives the snapshot request. The CN sends a query and the target CSN to a first data node DN in the database system. The target CSN is used by the first DN to determine a committed transaction on the first DN.

In the fourth aspect, based on the database system described in the first aspect, compared with sending an active transaction linked list between the first GTM, the CN, and the first DN, in the solution provided in the fourth aspect, only one CSN needs to be sent between the first GTM, the CN, and the first DN, so that network traffic can be reduced.

In a possible embodiment of the fourth aspect, the method further includes: The CN receives a message that is sent by the first DN and that indicates that a target transaction is successfully committed. In response to the message, the CN sends a transaction commit notification to the first GTM. The transaction commit notification indicates that the target transaction has been committed. The CN receives a CSN that is of the target transaction and that is sent by the first GTM. The CSN of the target transaction is a first global CSN allocated by the first GTM. The CN sends the CSN of the target transaction to the first DN. The CSN of the target transaction is used by the first DN to store a mapping relationship between the CSN of the target transaction and a first identifier. The first identifier is a local transaction identifier of the target transaction on the first DN.

In this possible embodiment, both the message indicating that the target transaction is successfully committed and the transaction commit notification indicate that the transaction is successfully committed, and the two messages may be a same message. Alternatively, the transaction commit notification may be obtained by the CN based on the message indicating that the target transaction is successfully committed. After the target transaction is committed, the first GTM allocates a currently allocated first global CSN to the target transaction. The first DN generates the local transaction identifier for the locally committed target transaction, and then stores the mapping relationship between the local transaction identifier of the target transaction and the CSN of the target transaction. In this way, the local transaction identifier of the target transaction on the first DN can be determined based on the CSN of the target transaction and the mapping relationship, and data can be found by using the local transaction identifier. In this possible embodiment, compared with a case in which the first GTM allocates one transaction identifier to each transaction and the first DN generates the local transaction identifier for the transaction, load of the first GTM is reduced, and network traffic generated for transferring the transaction identifier between the first GTM, the CN, and the first DN is reduced. This improves a throughput of the database system.

In a possible embodiment of the fourth aspect, the database system further includes a second DN. The target transaction is jointly executed by the first DN and the second DN. The method further includes: The CN sends a global identifier of the target transaction to the first DN. The global identifier includes an identifier of the second DN and a second identifier. The second identifier is a local transaction identifier of the target transaction on the second DN. The global identifier is used by the first DN to determine, based on the global identifier, the second DN that jointly executes the target transaction.

In this possible embodiment, after receiving a target transaction end message, the CN determines whether the target transaction is executed by one DN or a plurality of DNs. The "plurality of" here includes at least two. If the transaction is executed by the plurality of DNs, it indicates that the transaction is a distributed transaction. Considering that fault recovery needs to be performed when the database system is faulty, a same transaction distributed on different DNs needs to be found. Therefore, the CN delivers a GID to the DN that executes the target transaction. In this way, the plurality of DNs can accurately find all participating DNs of the distributed transaction based on the GID, to recover the target transaction when a fault occurs.

In a possible embodiment of the fourth aspect, before sending the snapshot request to the first GTM, the CN determines that the query is related to at least two DNs including the first DN.

In a possible embodiment of the fourth aspect, the CN receives a smallest CSN held and sent by each global DN, and determines a global clean value based on the smallest CSN held by each global DN. The global clean value is a smallest CSN in CSNs held by all the DNs. The CN sends the global clean value to the first DN. The global clean value is used by the first DN to clean dirty data based on the global clean value.

In this possible embodiment, a GTM does not need to participate in data cleaning. The CN initiates collection of the global clean value. The CN indicates the first DN to periodically clean the dirty data based on the global clean value. The dirty data may be understood as historical data of a modified transaction ID, and is invisible to the client.

A fifth aspect of this application provides a transaction management method, where the method is applied to a database system, the database system includes a first global transaction manager GTM, a first data node DN, and a coordinator node CN. The method further includes: The CN determines that a query is related to only the first DN. The CN sends the query and a single-node identifier to the first DN.

In this possible embodiment, after receiving the query sent by a client, the CN first determines whether the query is related to a single node or a plurality of nodes. If the single node is related, the CN may directly send the query and a single-node identifier to the first DN. The single-node identifier indicates that the query is related to the first DN. The first DN may use, based on the single-node identifier, a CSN of a last locally committed transaction as a target CSN. Because a single-node transaction relates to only one DN, a searching process of the foregoing committed transaction may also be implemented by using the CSN last obtained on the DN, and a globally latest CSN does not need to be obtained from the first GTM. In this way, network traffic generated when the CN requests the target CSN from the first GTM is further reduced.

A sixth aspect of this application provides a transaction management apparatus. The apparatus is the first DN in the database system in the first aspect. The apparatus is configured to perform the method in any one of the second aspect or the possible embodiments of the second aspect. Specifically, the apparatus includes modules or units configured to perform the method in any one of the second aspect or the possible embodiments of the second aspect, for example, a receiving unit, a first processing unit, a second processing unit, and a third processing unit. It should be noted that functions performed by the three processing units may also be implemented by using one or two processing units.

A seventh aspect of this application provides a transaction management apparatus. The apparatus is the first GTM in the database system in the first aspect. The apparatus is configured to perform the method in any one of the third aspect or the possible embodiments of the third aspect. Specifically, the apparatus includes modules or units configured to perform the method in any one of the third aspect or the possible embodiments of the third aspect, for example, a receiving unit and a sending unit.

An eighth aspect of this application provides a transaction management apparatus. The apparatus is the CN in the database system in the first aspect. The apparatus is configured to perform the method in any one of the fourth aspect, the fifth aspect, or the possible embodiments of the fourth aspect. Specifically, the apparatus includes modules or units configured to perform the method in any one of the fourth aspect, the fifth aspect, or the possible embodiments of the fourth aspect, for example, a receiving unit and a sending unit.

A ninth aspect of this application provides a transaction management apparatus. The apparatus is the first DN in the database system in the first aspect. The apparatus may include at least one processor, a memory, and a communication interface. The processor is coupled to the memory and the communication interface. The memory is configured to store instructions. The processor is configured to execute the instructions. The communication interface is configured to communicate with another network element under control of the processor. When the instructions are executed by the processor, the processor is enabled to perform the method in any one of the second aspect or the possible embodiments of the second aspect.

A tenth aspect of this application provides a transaction management apparatus. The apparatus is the first GTM in the database system in the first aspect. The apparatus may include at least one processor, a memory, and a communication interface. The processor is coupled to the memory and the communication interface. The memory is configured to store instructions. The processor is configured to execute the instructions. The communication interface is configured to communicate with another network element under control of the processor. When the instructions are executed by the processor, the processor is enabled to perform the method in any one of the third aspect or the possible embodiments of the third aspect.

An eleventh aspect of this application provides a transaction management apparatus. The apparatus is the CN in the database system in the first aspect. The apparatus may include at least one processor, a memory, and a communication interface. The processor is coupled to the memory and the communication interface. The memory is configured to store instructions. The processor is configured to execute the instructions. The communication interface is configured to communicate with another network element under control of the processor. When the instructions are executed by the processor, the processor is enabled to perform the method in any one of the fourth aspect, the fifth aspect, or the possible embodiments of the fourth aspect.

A twelfth aspect of this application provides a computer-readable storage medium. The computer-readable storage medium stores a program. The program enables a processor to perform the transaction management method according to any one of the second aspect and the embodiments of the second aspect.

A thirteenth aspect of this application provides a computer-readable storage medium. The computer-readable storage medium stores a program. The program enables a processor to perform the transaction management method according to any one of the third aspect and the embodiments of the third aspect.

A fourteenth aspect of this application provides a computer-readable storage medium. The computer-readable storage medium stores a program. The program enables a processor to perform the transaction management method according to any one of the fifth aspect, the fourth aspect, and the embodiments the fourth aspect.

A fifteenth aspect of this application provides a computer program product. The computer program product includes computer-executable instructions. The computer-executable instructions are stored in a computer-readable storage medium. At least one processor of a device may read the computer-executable instructions from the computer-readable storage medium. The at least one processor executes the computer-executable instructions, so that the device implements the transaction management method provided in any one of the second aspect or the possible embodiments of the second aspect.

A sixteenth aspect of this application provides a computer program product. The computer program product includes computer-executable instructions. The computer-executable instructions are stored in a computer-readable storage medium. At least one processor of a device may read the computer-executable instructions from the computer-readable storage medium. The at least one processor executes the computer-executable instructions, so that the device implements the transaction management method provided in any one of the third aspect or the possible embodiments of the third aspect.

A seventeenth aspect of this application provides a computer program product. The computer program product includes computer-executable instructions. The computer-executable instructions are stored in a computer-readable storage medium. At least one processor of a device may read the computer-executable instructions from the computer-readable storage medium. The at least one processor executes the computer-executable instructions, so that the device implements the transaction management method in any one of the fifth aspect, the fourth aspect, and the embodiments the fourth aspect.

An eighteenth aspect of this application provides a chip system. The chip system includes a processor, configured to support a transaction management apparatus in implementing the function in any one of the second aspect or the possible embodiments of the second aspect. In a possible design, the chip system may further include a memory. The memory is configured to store program instructions and data that are necessary for the transaction management apparatus. The chip system may include a chip, or may include a chip and another discrete component.

A nineteenth aspect of this application provides a chip system. The chip system includes a processor, configured to support a transaction management apparatus in implementing the function in any one of the third aspect or the possible embodiments of the third aspect. In a possible design, the chip system may further include a memory. The memory is configured to store program instructions and data that are necessary for the transaction management apparatus. The chip system may include a chip, or may include a chip and another discrete component.

A twentieth aspect of this application provides a chip system. The chip system includes a processor, configured to support a transaction management apparatus in implementing the function in any one of the fifth aspect, the fourth aspect, or the possible embodiments of the fourth aspect. In a possible design, the chip system may further include a memory. The memory is configured to store program instructions and data that are necessary for the transaction management apparatus. The chip system may include a chip, or may include a chip and another discrete component.

Understandably, any one of the transaction management apparatus, the computer storage medium, or the computer program product provided above is configured to perform the method of the corresponding transaction management apparatus provided above. Therefore, for beneficial effects that can be achieved by the transaction management apparatus, the computer storage medium, or the computer program product, refer to beneficial effects in the corresponding method provided above. Details are not described herein again.

DESCRIPTION OF EMBODIMENTS

The following describes embodiments of this application with reference to accompanying drawings. It is clear that the described embodiments are merely some rather than all of embodiments of this application. A person of ordinary skill in the art may learn that, with development of technologies and emergence of a new scenario, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

Embodiments of this application provide a database system and a transaction management method, to reduce network traffic and improve concurrency and scalability of the database system. Embodiments of this application further provide a corresponding apparatus. Details are separately described in the following.

Figure 1A:
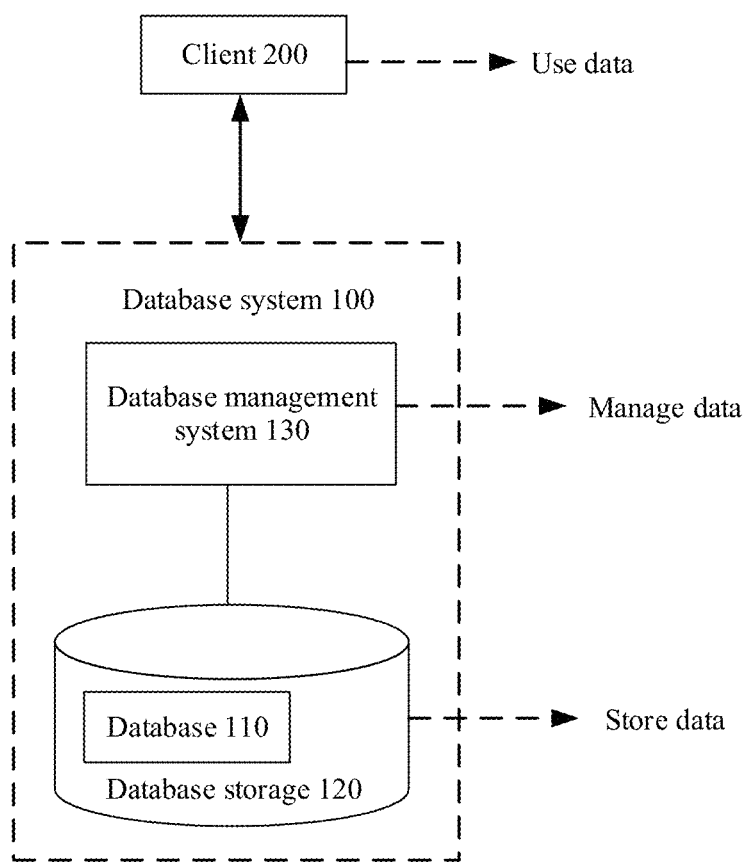
FIG. 1A is a schematic diagram of an architecture of a database system.

The method provided in embodiments of this application may be applied to a database system. FIG. 1A shows a typical logical architecture of a database system. According to FIG. 1A, a database system 100 includes a database 110 and a database management system (DBMS) 130.

The database 110 is an organized data set stored in a data storage 120, that is, an associated data set organized, stored, and used based on a particular data model. Based on different data models used for organizing data, the data may be divided into a plurality of types, for example, relational data, graph data, and time series data. The relational data is data modeled by using a relational model, and is usually represented as a table, where a row in the table represents a set of associated values of an object or entity. The graph data, "graph" for short, is used to represent a relationship, for example, a social relationship, between objects or entities. The time series data, time series data for short, is a data column recorded and indexed in a time sequence, and is used to describe status transition information of an object in a time dimension.

The database management system 130 is a core of the database system, and is system software used to organize, store, and maintain data. The client 200 may access the database 110 by using the database management system 130, and a database administrator also maintains the database by using the database management system. The database management system 130 provides various functions for the client 200 to establish, modify, and query the database, where the client 200 may be an application or user equipment. The functions provided by the database management system 130 may include but are not limited to the following items: (1) a data definition function: the database management system 130 provides a data definition language (data definition language, DDL) to define a structure of the database 110, where the DDL is used to depict a database framework, and may be stored in a data dictionary; (2) a data access function: the database management system 130 provides a data manipulation language (data manipulation language, DML) to implement basic access operations on the database 110, for example, retrieval, insertion, modification, and deletion; (3) a database operation management function: the database management system 130 provides a data control function to effectively control and manage operation of the database 110, to ensure correct and effective data; (4) database establishment and maintenance functions, including functions such as loading of initial data of the database, dump, restoration, and reorganization of the database, and monitoring and analysis of system performance; and (5) transmission of the database: the database management system provides transmission of processed data, to implement communication between the client and the database management system, and the database management system usually coordinates with an operating system to complete the transmission of the processed data.

The data storage 120 includes but is not limited to a solid state disk (SSD), a disk array, a cloud storage, or another type of non-transitory computer-readable storage medium. A person skilled in the art may understand that the database system may include components more or less than those shown in FIG. 1A, or include components different from those shown in FIG. 1A. FIG. 1A merely shows components more related to embodiments disclosed in the embodiments of the present invention.

The database system provided in this embodiment of this application may be a distributed database system (DDBS). During transaction processing of the DDBS, a global transaction manager (GTM) is used to manage transactions to implement concurrency control between transactions. The following describes the DDBS with reference to FIG. 1B and FIG. 1C.

Figure 1B:
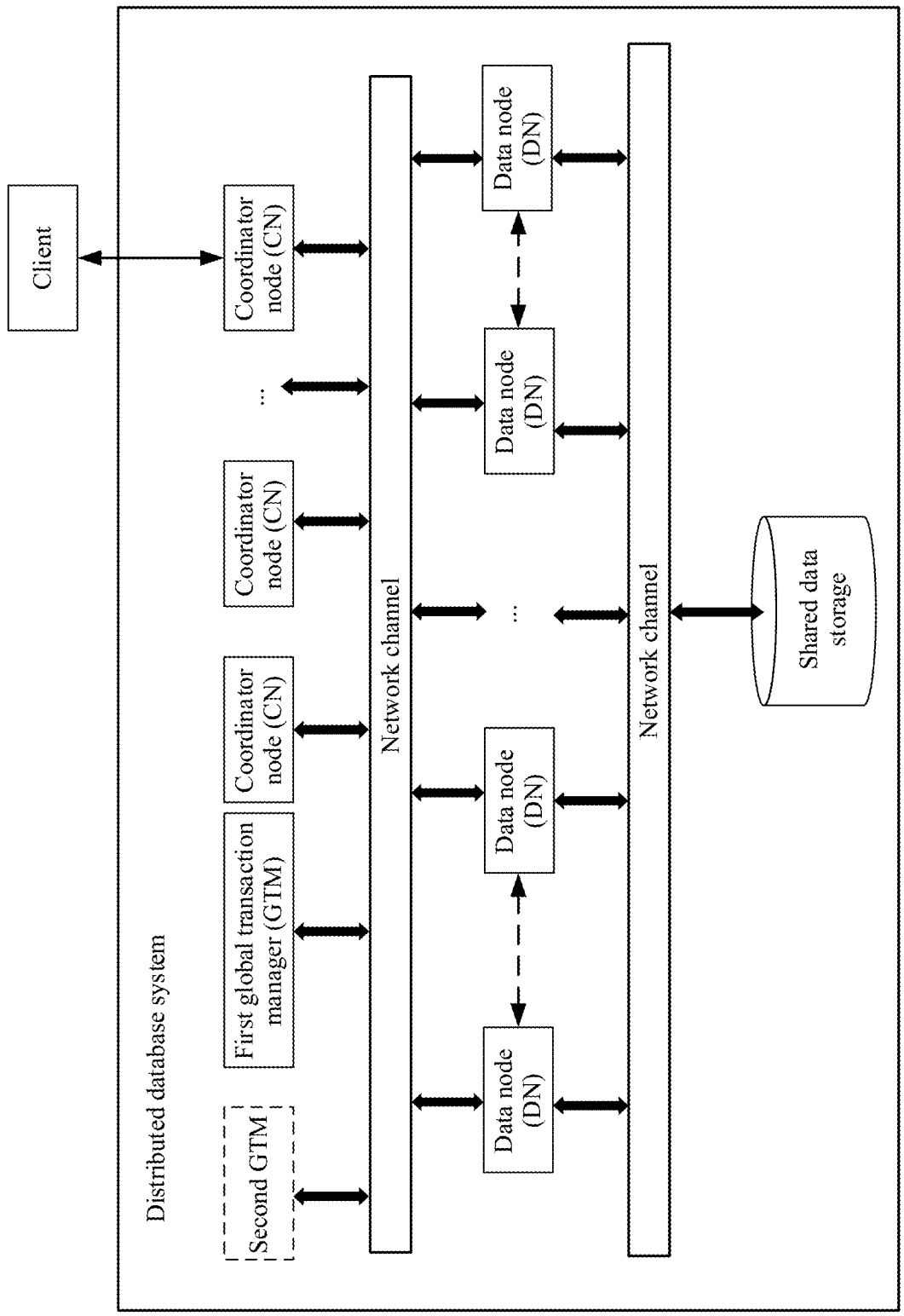
FIG. 1B is a schematic diagram of an architecture of a distributed database system according to an embodiment of this application.

FIG. 1B is a schematic diagram of a distributed database system that uses a shared-storage architecture. The distributed database system includes one or more coordinator nodes (CN), a plurality of data nodes (DN), and one or more GTMs (for example, a first GTM and a second GTM in FIG. 1B). The first GTM is used as a primary GTM. The second GTM is configured to back up data of the first GTM, and take over work of the first GTM when the first GTM is faulty. In this way, high reliability of the DDBS can be ensured. The CN and the DN communicate with each other through network channels. In an embodiment, the network channel may be formed by network devices such as a switch, a router, and a gateway. The CN, the DN, and the GTM work together to implement the functions of the database management system and provide a client with services such as database retrieval, insertion, modification, and deletion. In an embodiment, a database management system is deployed on each CN, DN, and GTM. A shared data memory stores data that can be shared by the plurality of DNs, and the DN may perform a read/write operation on the data in the data memory through the network channel. The shared data memory may be a shared disk array. The CN, the DN, the first GTM, or the second GTM in the distributed database system may be a physical machine, for example, a database server, or may be a virtual machine (VM) or a container running on an abstract hardware resource. In an embodiment, the CN, the DN, the first GTM, or the second GTM is the virtual machine or the container. The network channel is a virtual switching network. The virtual switching network includes a virtual switch. A database management system deployed on the CN, the DN, the first GTM, or the second GTM is a DBMS instance. The DBMS instance may be a process or a thread. These DBMSs cooperate to complete a function of a database relational system. In another embodiment, the CN, the DN, the first GTM, or the second GTM is the physical machine. The network channel includes one or more switches. The switch is a storage area network (SAN) switch, an Ethernet switch, a fiber channel switch, or another physical switching device.

Figure 1C:
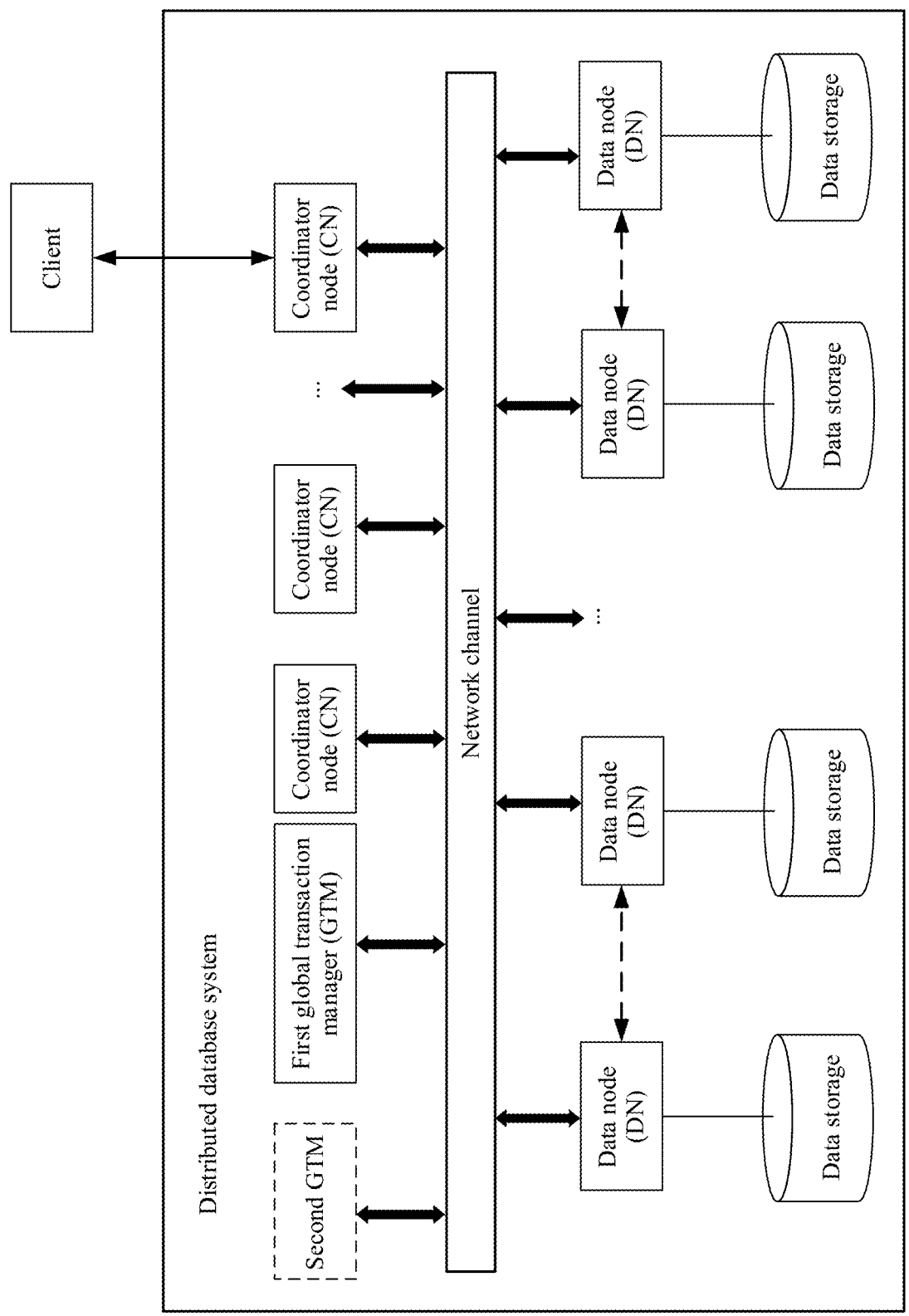
FIG. 1C is a schematic diagram of another architecture of a distributed database system according to an embodiment of this application.

FIG. 1C is a schematic diagram of a distributed database system using a shared-nothing architecture. Each DN has an exclusive hardware resource (such as a data memory), an operating system, and a database. A CN, a DN, a first GTM, or a second GTM communicates with each other through a network channel. For understanding of the network channel, refer to corresponding descriptions in FIG. 1B. In the system, data is distributed to the DNs based on a database model and an application characteristic. A query task is divided by the CN into several portions, to be executed concurrently on all the DNs. All the DNs perform calculation coordinately and are used as a whole to provide a database service. All communication functions are implemented in a high-bandwidth network interconnection system. Like the distributed database system of the shared-storage architecture described in FIG. 1B, the CN, the DN, the first GTM, or the second GTM herein may be a physical machine or a virtual machine.

In all embodiments of this application, a data storage of the database system includes but is not limited to a solid state drive (SSD), a disk array, or a non-transitory computer-readable medium of another type. Although the database is not shown in FIG. 1B and FIG. 1C, it should be understood that the database is stored in the data storage. A person skilled in the art may understand that the database system may include fewer or more components than those shown in FIG. 1A to FIG. 1C, or include components different from those shown in FIG. 1A to FIG. 1C. FIG. 1A to FIG. 1C merely show components more related to embodiments disclosed in embodiments of this application. However, a person skilled in the art may understand that a distributed database system may include any quantity of CNs and DNs. A database management system function of each CN and DN may be implemented by using an appropriate combination of software, hardware, and/or firmware on the CN and the DN.

The distributed database system described in FIG. 1B and FIG. 1C includes a plurality of DNs and a plurality of CNs. All the DNs have basically the same functions, and all the CNs also have basically the same functions. For ease of description, the following uses a first DN and a CN for description. The first DN is any DN in the plurality of DNs, and the CN is any CN in the plurality of CNs.

Based on the distributed database systems described in FIG. 1B and FIG. 1C, the transaction management method may include two aspects: visibility management of a committed transaction and management in a commit process of an active transaction. Description is separately provided in the following.

1. Visibility Management of a Committed Transaction.

Visibility is for a client. The client can access only committed transactions before sending an operation request. These transactions can be described as "visible" for the client. Neither an active transaction that is being executed nor a to-be-executed transaction that is waiting to be executed when the operation is sent can be accessed. These transactions may be described as "invisible" to a client.

A transaction of a database system is a database operation sequence, and includes all operations performed between a start of a transaction and an end of the transaction. These operations are either all executed or not executed, and are an inseparable unit of working. For example, if a transfer process from an account A to an account B is used as a transaction, the transaction may include two operations: 1. Subtract a transfer amount from a balance of the account A. 2. Increase a balance of the account B by the transfer amount. If the second operation is not complete, the entire transaction should be canceled. In other words, the transaction is successfully executed only when all operations included in the transaction are successfully executed. Otherwise, the transaction fails to be executed. The transaction can be committed to the data storage for storage only after it is successfully executed. After being committed, the transaction is referred to as a committed transaction.

Figure 1D:
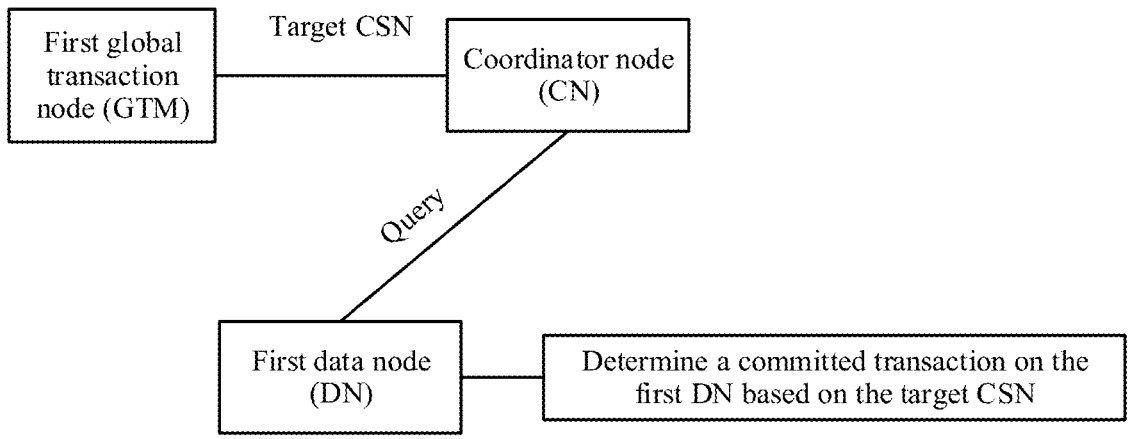
FIG. 1D is a schematic diagram of an embodiment of a database system according to an embodiment of this application.

In an embodiment, the first GTM maintains a global commit sequence number (CSN), and increments or decrements the global commit sequence number based on a transaction commit atom. To be specific, when each transaction is committed, the GTM increments or decrements the CSN in an atomic operation manner. For example, adding 1 CSN may be a 64-bit character string, or may be a character string of another length. A length of the CSN is not limited in this application. The CSN may be represented in a form of a number, or may be represented by another character, for example, abcd or a combination of digits and characters. In a process of managing the committed transaction, as shown in FIG. 1D, the CN receives a query from the client, and sends the query to the first DN. The query may be a query that is the same as the query received by the CN from the client, or may be generated by the CN based on the query received from the client. It should be noted that "query" in all embodiments of this application is a request or a statement for operating a database, for example, a statement used to retrieve, insert, modify, and delete data. In response to the query, the first DN determines a target commit sequence number CSN, determines the committed transaction on the first DN based on the target CSN, and determines, based on the committed transaction, a query result corresponding to the query. The target CSN is allocated by the first GTM. The target CSN is used to distinguish between the committed transaction and an active transaction on the first DN. The active transaction is a transaction that is being executed.

In this embodiment of this application, after receiving the query from the client, the CN first determines whether the query is related to a single node or a plurality of nodes. In an embodiment, the CN may determine, by using an execution plan of the query, whether the query is related to a single DN or a plurality of DNs. The execution plan describes operations and DNs related to the query. It can be determined that whether the query is related to the single DN or the plurality of DNs by parsing the execution plan corresponding to the query. Then, the transaction management method may be executed according to different processes, which are separately described in the following.

1. For a transaction management method obtained after the CN determines that the query is related to a plurality of DNs, refer to FIG. 2.

Figure 2:
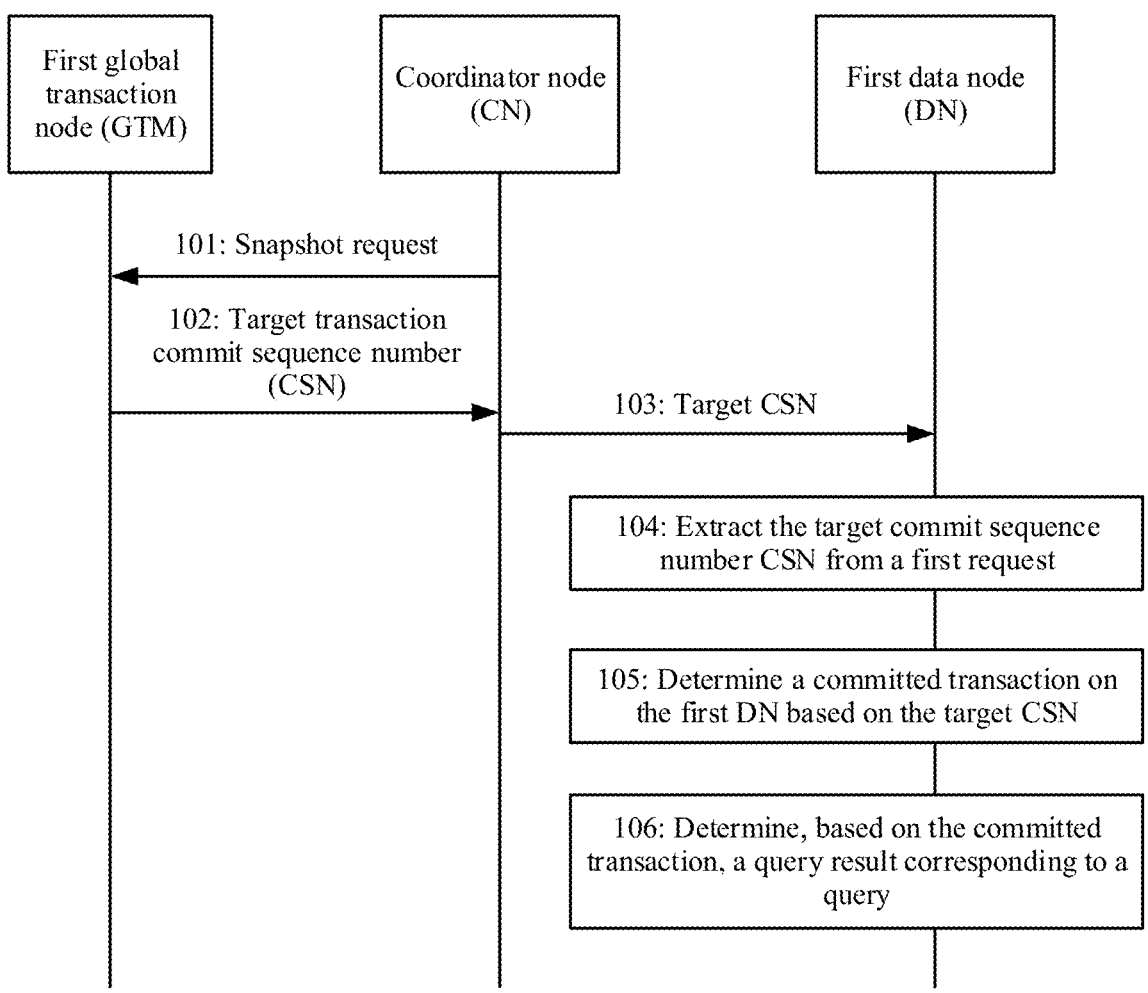
FIG. 2 is a schematic diagram of an embodiment of a transaction management method according to an embodiment of this application.

As shown in FIG. 2, an embodiment of a transaction management method provided in an embodiment of this application includes the following operations.

101: The CN sends a snapshot request to a first GTM. Correspondingly, the first GTM receives the snapshot request sent by the CN.

102: The first GTM sends a target commit sequence number CSN to the CN.

Correspondingly, the CN receives the target commit sequence number CSN sent by the first GTM.

The target CSN is used to distinguish between a committed transaction and an active transaction on the first DN. The active transaction is a transaction that is being executed.

The first GTM maintains a global CSN. The global CSN may be a globally largest CSN or a globally smallest CSN. Global refers to an entire database system.

The target CSN is a global CSN allocated when the first GTM receives the snapshot request.

103: The CN sends a first request to a first DN. Correspondingly, the first DN receives the first request sent by the CN.

The first request includes the query and the target CSN. Actually, the query and the target CSN may not be encapsulated into the first request, or the query and the target CSN may be transmitted separately in two messages.

A query refers to a query operation, which can contain query, modification, addition, or deletion statements.

104: The first DN extracts the target commit sequence number CSN from the first request.

The first DN may parse the first request, and extract the CSN from a specified field of the query. The specified field may be a field pre-negotiated by the first DN and the CN.

105: The first DN determines a committed transaction on the first DN based on the target CSN.

Each committed transaction has a CSN. The CSN is allocated by the first GTM after the transaction is committed to a data storage. The first GTM usually allocates the CSN by incrementing or decrementing the CSN. Therefore, the first DN may determine the committed transaction by comparing sizes. If the first GTM allocates CSNs by incrementing the CSN, the target CSN is a largest CSN in all allocated CSNs. The first DN may determine, in a size comparison manner, that a transaction whose CSN is not greater than the target CSN is the committed transaction. If the first GTM allocates CSNs by decrementing the CSN, the target CSN is a smallest CSN in all allocated CSNs. The first DN may determine, in a size comparison manner, that a transaction whose CSN is not less than the target CSN is the committed transaction.

Figure 3A:
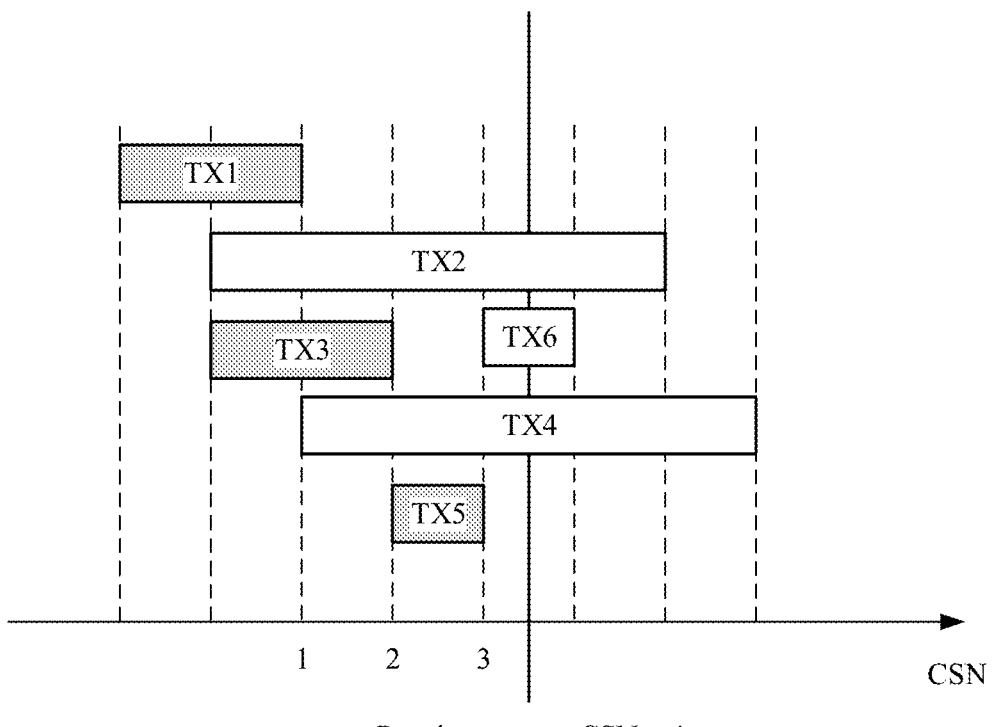
FIG. 3A is a schematic diagram of an example scenario according to an embodiment of this application.
Figure 3B:
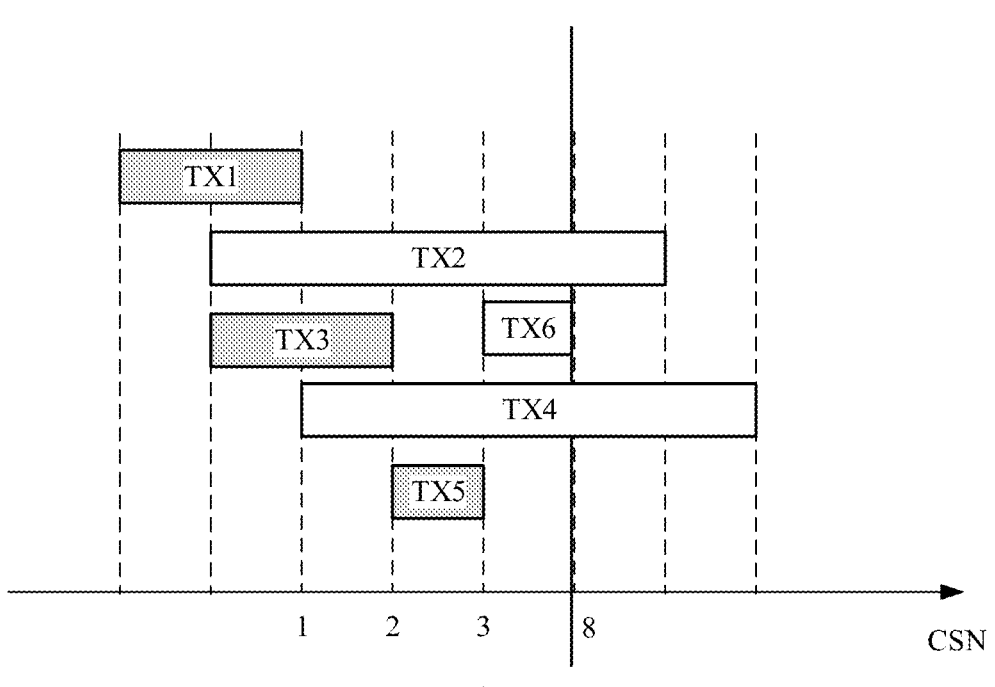
FIG. 3B is a schematic diagram of another example scenario according to an embodiment of this application.

An example in which the first GTM allocates the CSNs by incrementing the CSN is used for description with reference to the scenarios shown in FIG. 3A and FIG. 3B.

As shown in FIG. 3A, when the first DN receives a target CSN=4, on the first DN, committed transactions include a TX1, a TX3, and a TX5, and active transactions include a TX2, a TX4, and a TX6. A CSN of the TX1=1, a CSN of the TX3=2, and a CSN of the TX5=3. CSNs have not been allocated to the TX2, the TX4, and the TX6. In this case, the CSN=4 is compared with the CSN=1, 2, and 3, and it may be determined that committed transactions smaller than the CSN=4 include the TX1, the TX3, and the TX5.

As shown in FIG. 3B, if the transaction TX6 is committed when the target CSN=4 is received, the first GTM allocates a CSN=8 to the transaction TX6. In this case, although the TX6 is also a committed transaction, the TX6 is invisible to a client. Therefore, after the CSN=4 is compared with 6, the TX6 is not determined as the committed transaction in this scenario.

106: The first DN determines, based on the committed transaction, a query result corresponding to the query.

There is a mapping relationship between a local transaction identifier and a CSN on the first DN. The local transaction identifier of the committed transaction may be found based on the CSN. Data stored in the first DN records a corresponding local transaction identifier. In this way, data may be scanned based on the local transaction identifier of the committed transaction, to obtain the query result. The query result is data corresponding to the query.

Refer to scenarios shown in FIG. 3A and FIG. 3B, if a first transaction is the TX3, the TX3 may be determined from the TX1, the TX3, and the TX5 based on a local identifier of the TX3.

Compared with that the first GTM determines an active transaction linked list by using a lock, the first GTM, the CN, and the first DN send the active transaction linked list to each other, and the first DN determines the committed transaction by using the active transaction linked list. According to the solution provided in this embodiment of this application, the first GTM only needs to maintain a globally latest CSN. This not only avoids a lock conflict, but also reduces a calculation amount of searching for a large quantity of active transactions by the first GTM. This helps the first GTM access more requests. Only one CSN needs to be sent between the first GTM, the CN, and the first DN, so that network traffic can be reduced. The first DN may determine the committed transaction by comparing sizes of CSNs, so that a calculation amount of the first DN can be reduced. It can be learned that the solution provided in this embodiment of this application helps improve concurrency and scalability of the database system.

Figure 4:
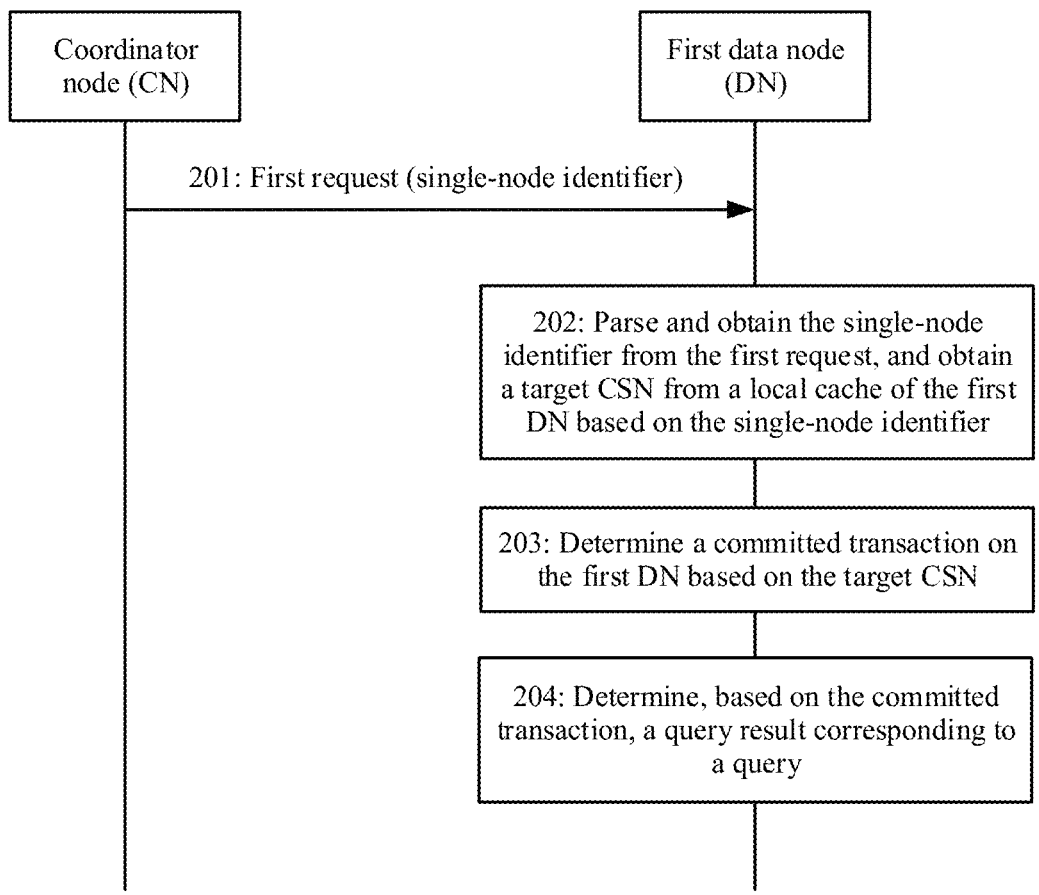
FIG. 4 is a schematic diagram of another embodiment of a transaction management method according to an embodiment of this application.

2. For a transaction management method obtained after the CN determines that the query is related to a single DN, refer to FIG. 4.

201: The CN sends a first request to a first DN. Correspondingly, the first DN receives the first request sent by the CN.

The first request includes a query and a single-node identifier. The single-node identifier indicates that the query is related to only a first node.

Alternatively, the query and the single-node identifier may not need to be encapsulated into the first request, or the query and the single-node identifier may be separately sent twice.

202: The first DN parses and obtains the single-node identifier from the first request, and obtains a target CSN from a local cache of the first DN based on the single-node identifier.

The target CSN is a CSN allocated by a first GTM to a latest transaction committed by the first DN.

203: The first DN determines a committed transaction on the first DN based on the target CSN.

Each committed transaction has a CSN. The CSN is allocated by the first GTM after the transaction is committed to a data storage. The first GTM usually allocates the CSN by incrementing or decrementing the CSN. Therefore, the first DN may determine the committed transaction by comparing sizes. If the first GTM allocates CSNs by incrementing the CSN, the target CSN is a largest CSN on the first DN.

The first DN may determine, in a size comparison manner, that a transaction whose CSN is not greater than the target CSN is the committed transaction. If the first GTM allocates CSNs by decrementing the CSN, the target CSN is a smallest CSN on the first DN. The first DN may determine, in a size comparison manner, that a transaction whose CSN is not less than the target CSN is the committed transaction.

Figure 5A:
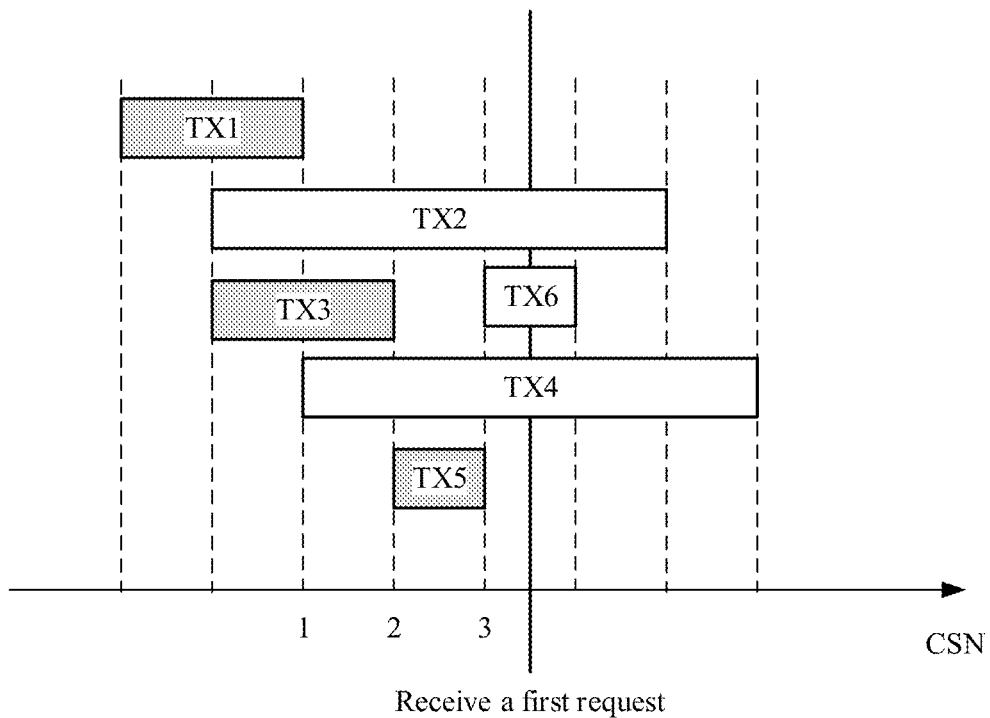
FIG. 5A is a schematic diagram of still another example scenario according to an embodiment of this application.
Figure 5B:
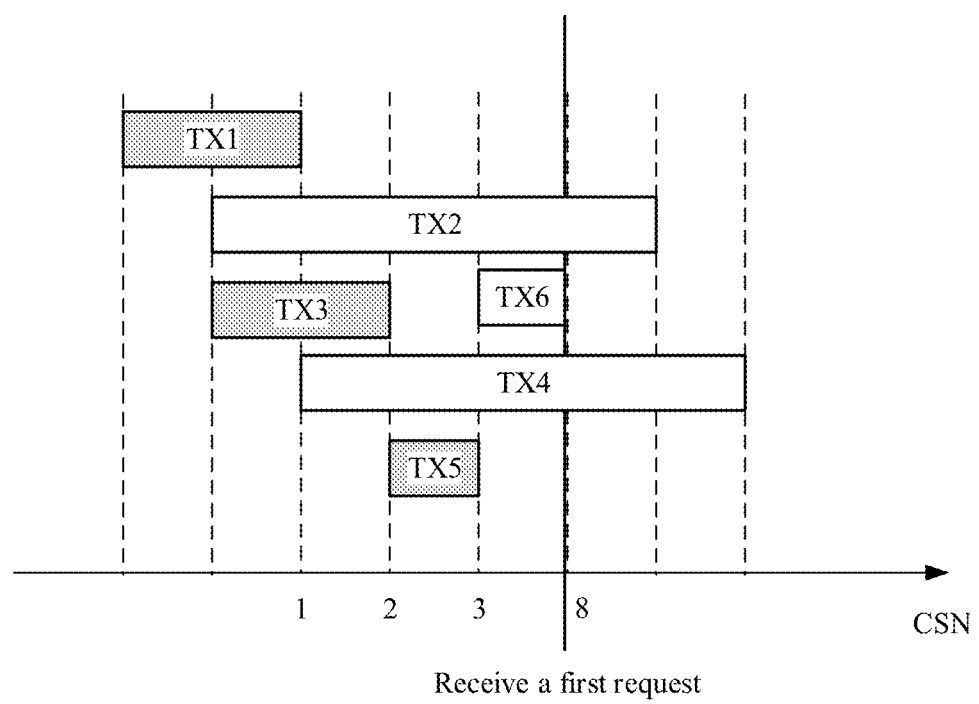
FIG. 5B is a schematic diagram of yet another example scenario according to an embodiment of this application.

An example in which the first GTM allocates the CSNs by incrementing the CSN is used for description with reference to the scenarios shown in FIG. 5A and FIG. 5B.

As shown in FIG. 5A, when the first request is received, on the first DN, committed transactions include a TX1, a TX3, and a TX5, and active transactions include a TX2, a TX4, and a TX6. A CSN of the TX1=1, a CSN of the TX3=2, and a CSN of the TX5=3. CSNs have not been allocated to the TX2, the TX4, and the TX6.

The first DN determines, by using the single-node identifier in the first request, that the target CSN=3, that is, a currently largest CSN on the first DN.

In this case, the CSN=3 is compared with the CSN=1, 2, and 3, and it may be determined that committed transactions whose CSNs are less than or equal to the CSN=3 include the TX1, the TX3, and the TX5. In other words, committed transactions that are not greater than the target CSN=3 are the TX1, the TX3, and the TX5.

As shown in FIG. 5B, if it is determined that the target CSN=3 and a transaction TX6 is committed when the first request is received, the first GTM allocates a CSN=8 to the transaction TX6. In this case, although the TX6 is also a committed transaction, the TX6 is invisible to a client. Therefore, after the CSN=3 is compared with 6, the TX6 is not determined as the committed transaction in this scenario.

204: The first DN determines, based on the committed transaction, a query result corresponding to the query.

The process may be understood with reference to the foregoing operation 106.

Because a single-node transaction relates to only one DN, a searching process of the foregoing committed transaction may also be implemented by using the CSN last obtained on the DN, and a globally latest CSN does not need to be obtained from the first GTM. In this way, network traffic generated when the CN requests the target CSN from the first GTM is further reduced.

2. Management in a commit process of an active transaction.

A target transaction is a transaction that is being executed on a first DN, that is, the active transaction. Execution of the active transaction is terminated by a CN by receiving a target transaction end (commit) message sent by a client. After receiving the target transaction end message, the CN determines whether the target transaction is executed by one DN or jointly executed by a plurality of DNs, and then transaction management methods may be executed according to different procedures. The following separately describes the methods.

Figure 6:
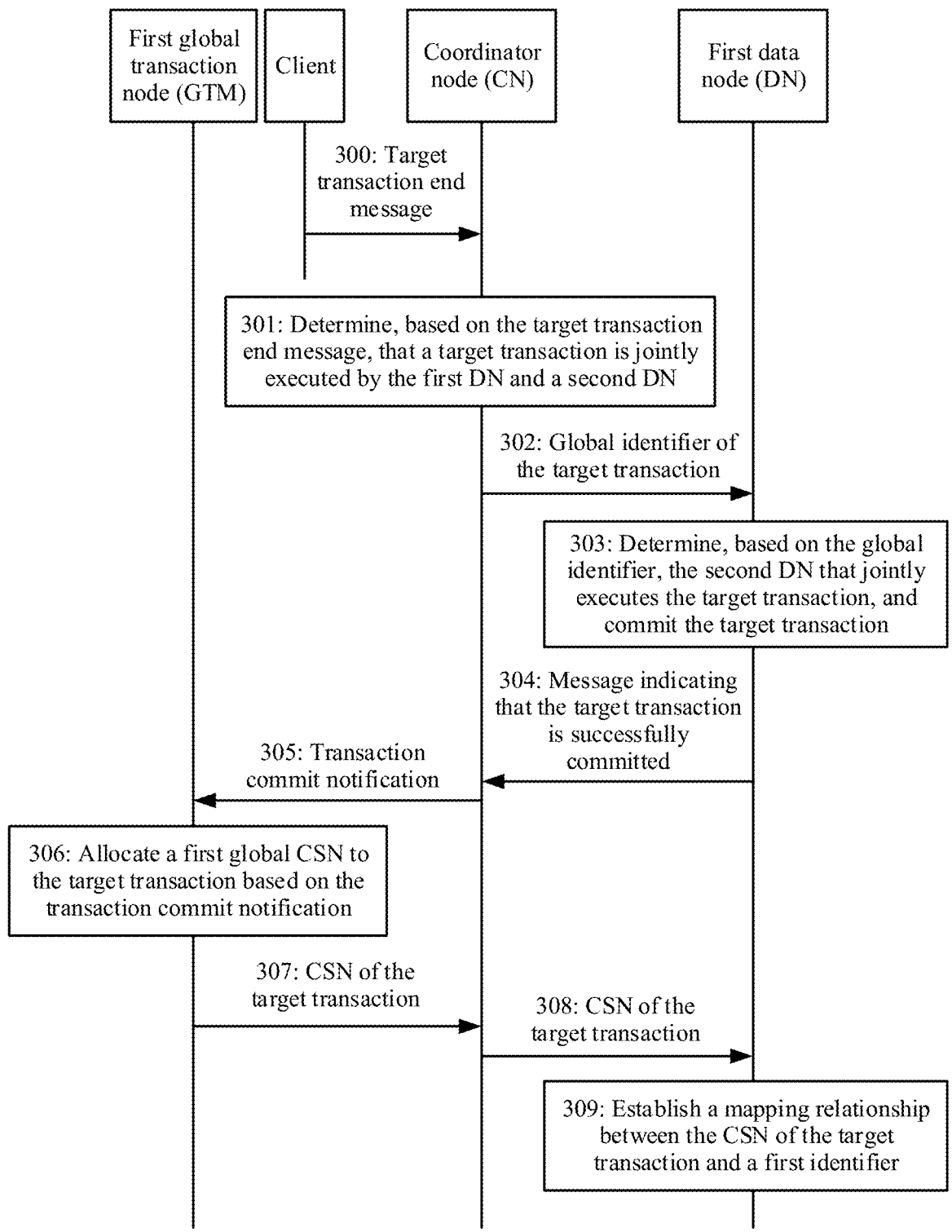
FIG. 6 is a schematic diagram of another embodiment of a transaction management method according to an embodiment of this application.

1. For a transaction management method obtained after the CN determines that the target transaction is a multi-node transaction, refer to FIG. 6.

300: The CN receives a target transaction end message sent by the client.

301: The CN determines, based on the target transaction end message, that the target transaction is jointly executed by the first DN and a second DN.

A transaction jointly executed by the plurality of DNs refers to a transaction jointly executed by two or more DNs. The CN may determine, based on a record of a DN that executes the target transaction and that is related when the target transaction starts, DNs that jointly execute the target transaction. For example, when the target transaction starts, the CN determines that the target transaction is jointly executed by a DN1 and a DN2. The CN stores records of the target transaction, the DN1, and the DN2. After the CN receives a message indicating that the target transaction ends, the CN may determine, from the records of the target transaction and the DN1 and the DN2, that the DN1 and the DN2 execute the target transaction.

302: The CN is configured to send a global identifier (global identity, GID) of the target transaction to the first DN. Correspondingly, the first DN receives the global identifier that is of the target transaction and that is sent by the CN.

The global identifier includes an identifier of the second DN and a second identifier. The second identifier is a local transaction identifier of the target transaction on the second DN.

Figure 7A:
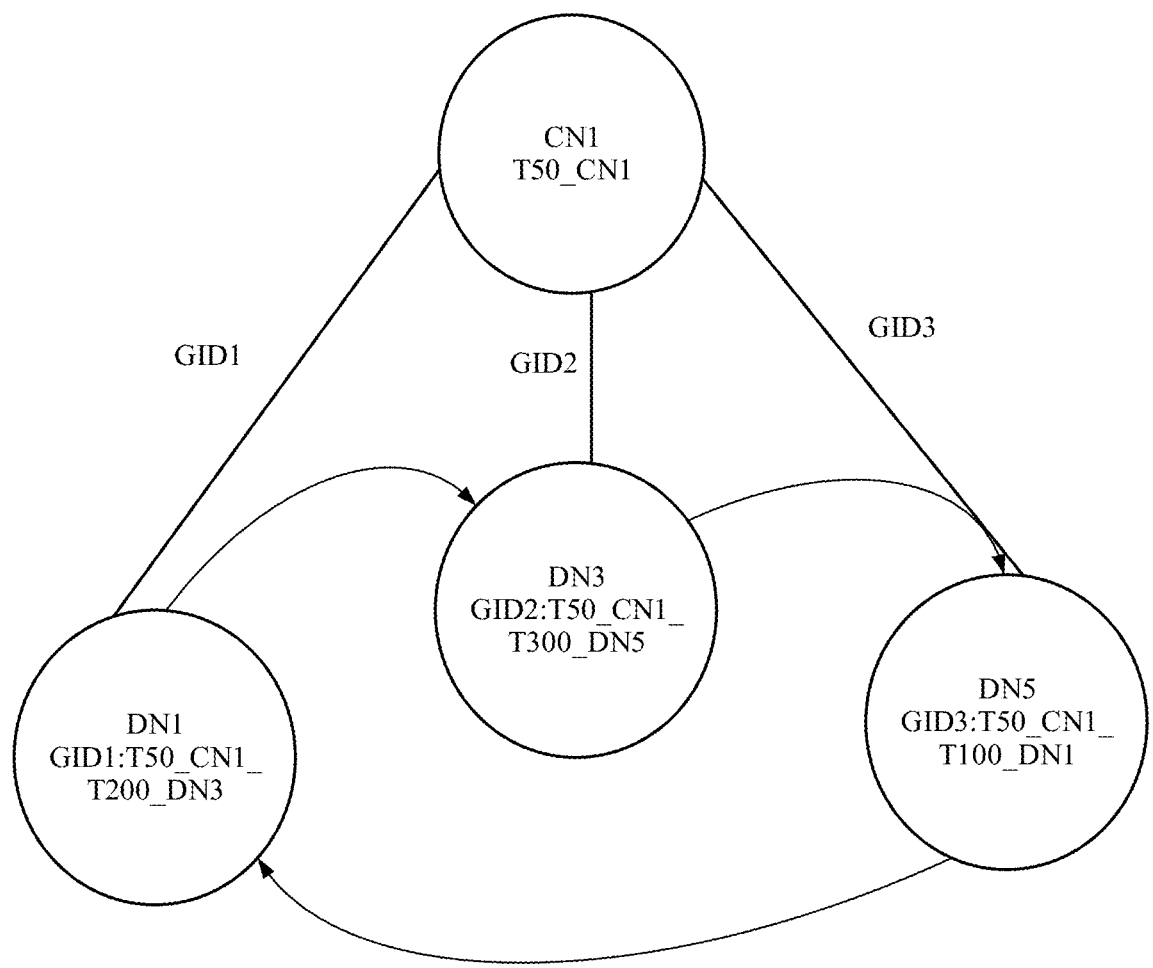
FIG. 7A is a schematic diagram of still yet another example scenario according to an embodiment of this application.

For the multi-node transaction, same transactions distributed on different DNs needs to be found because the database system needs to be recovered when a fault occurs. Therefore, the CN delivers the GID to the DN that executes the target transaction. In this way, the plurality of DNs can accurately find all participating DNs of the multi-node transaction based on the GID. For different DNs that execute a same transaction, the CN delivers different GIDs. The following describes a GID in the multi-node transaction with reference to FIG. 7A. As shown in FIG. 7A, if determining that the target transaction is jointly executed by a DN1, a DN3, and a DN5, a CN1 sends a GID1 to the DN1, sends a GID2 to the DN3, and sends a GID3 to the DN5.

The GID1 is represented as T50_CN1_T200_DN3. The T50_CN1 represents an identifier of a coordinator node. The DN3 is an identifier of a data node. The T200 is a local transaction identifier of the target transaction on the DN3.

The GID2 is represented as T50_CN1_T300_DN5. The T50_CN1 represents the identifier of the coordinator node. The DN5 is the identifier of the data node. The T300 is a local transaction identifier of the target transaction on the DN5.

The GID3 is represented as T50_CN1_T100_DN1. The T50_CN1 represents the identifier of the coordinator node. The DN1 is the identifier of the data node. The T100 is a local transaction identifier of the target transaction on DN1.

The T100, the T200, and the T300 may be respectively local node identifiers generated by the DN1, the DN3, and the DN5 for the target transaction, and then notified to the CN1.

The CN1 may find, based on the GID1, the DN3 that jointly executes the target transaction. The DN3 may find, based on the GID2, the DN5 that jointly executes the target transaction. The DN5 may find, based on the GID3, the DN1 that jointly executes the target transaction. This implements a finding closed loop in FIG. 7, to find all participating DNs that jointly executes the target transaction. In this way, during fault recovery, the database system may search for the target transaction by using the relationship in the foregoing example, to quickly recover the target transaction.

303: The first DN is configured to: determine, based on the global identifier, the second DN that jointly executes the target transaction, and commit the target transaction.

Committing the target transaction means that the first DN commits the target transaction to a data storage for storage.

304: The first DN sends, to the CN, a message indicating that the target transaction is successfully committed. Correspondingly, the CN receives the message that is sent by the first DN and that indicates that the target transaction is successfully committed.

305: The CN sends a transaction commit notification to a first GTM. Correspondingly, the first GTM receives the transaction commit notification sent by the CN.

The transaction commit notification indicates that the target transaction has been committed. Both the message indicating that the target transaction is successfully committed and the transaction commit notification indicate that the transaction is successfully committed, and the two messages may be a same message. Alternatively, the transaction commit notification may be obtained by the CN based on the message indicating that the target transaction is successfully committed.

306: The first GTM allocates a first global CSN to the target transaction based on the transaction commit notification.

Because there may be a plurality of CNs in the database system, the first GTM may correspond, by using a plurality of worker threads, to requests sent by different CNs. To ensure high reliability of the database system, when the first GTM is configured to send the CSN of the target transaction to the CN, the first GTM is configured to send a third global CSN to a second GTM by using an asynchronous thread. The third global CSN is obtained by the first GTM by incrementing or decrementing the first global CSN. Generally, the CSN is incremented. Certainly, the CSN may also be decremented, or obtained in another CSN update manner. The increment is used as an example. A operation of increment is usually 1, and certainly may also be 2 or another value. For example, the operation of increment is 1. If the first global CSN is 0000005, the third global CSN is 0000006.

Figure 7B:
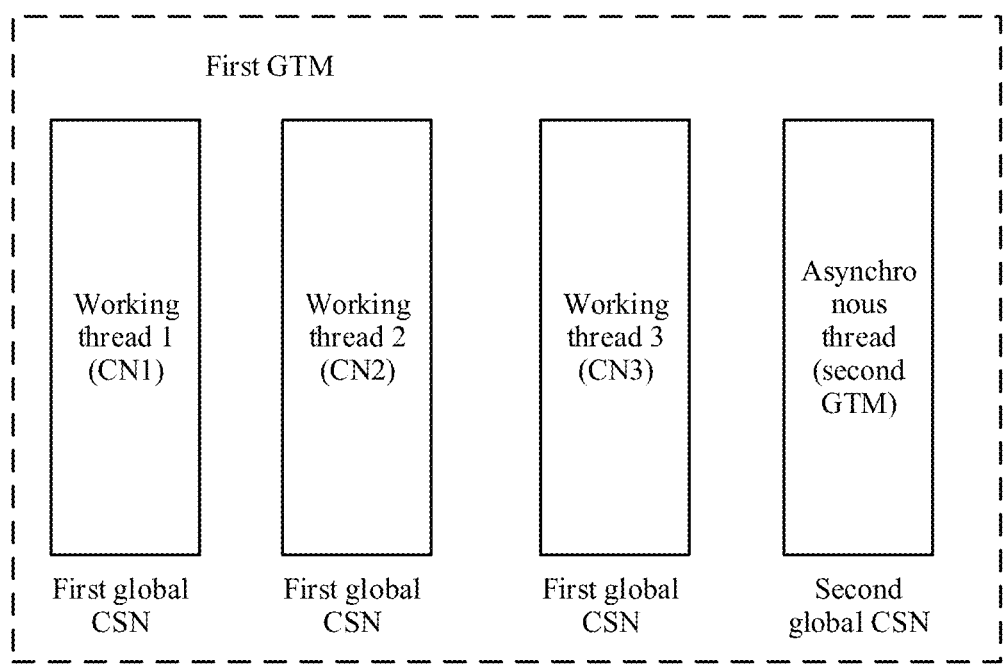
FIG. 7B is a schematic diagram of further another example scenario according to an embodiment of this application.

For a process in which the first GTM sends the CSN to the CN and a process in which the first GTM sends the CSN to the second GTM, refer to the scenario in FIG. 7B. As shown in FIG. 7B, in the first GTM, a working thread 1 is communicatively connected to a CN1, a working thread 2 is communicatively connected to a CN2, and a working thread 3 is communicatively connected to a CN3. The first GTM may deliver the first global CSN to the CN1 by using the worker thread 1, deliver the first global CSN to the CN2 by using the worker thread 2, and deliver the first global CSN to the CN3 by using the worker thread 3. After sending the first global CSN, the first GTM obtains the third global CSN by incrementing or decrementing the first global CSN. The first GTM delivers the third global CSN to the second GTM by using an asynchronous thread.

307: The first GTM sends the CSN of the target transaction to the CN. Correspondingly, the CN receives the CSN of the target transaction sent by the first GTM.

308: The CN sends the CSN of the target transaction to the first DN. Correspondingly, the first DN receives the CSN that is of the target transaction and that is sent by the CN.

309: The first DN stores a mapping relationship between the CSN of the target transaction and a first identifier.

The first identifier is a local transaction identifier of the target transaction on the first DN.

The first DN generates a local transaction identifier for a locally committed target transaction, and then stores a mapping relationship between the local transaction identifier of the target transaction and the CSN of the target transaction. In this way, the local transaction identifier of the target transaction on the first DN can be determined based on the CSN of the target transaction and the mapping relationship. Data corresponding to the query is determined based on the local transaction identifier of data stored in the first DN. In this possible embodiment, compared with a case in which the first GTM allocates one transaction identifier to each transaction and the first DN generates the local transaction identifier for the transaction, load of the first GTM is reduced, and network traffic generated for transferring the transaction identifier between the first GTM, the CN, and the first DN is reduced. This improves a throughput of the database system.

Figure 8:
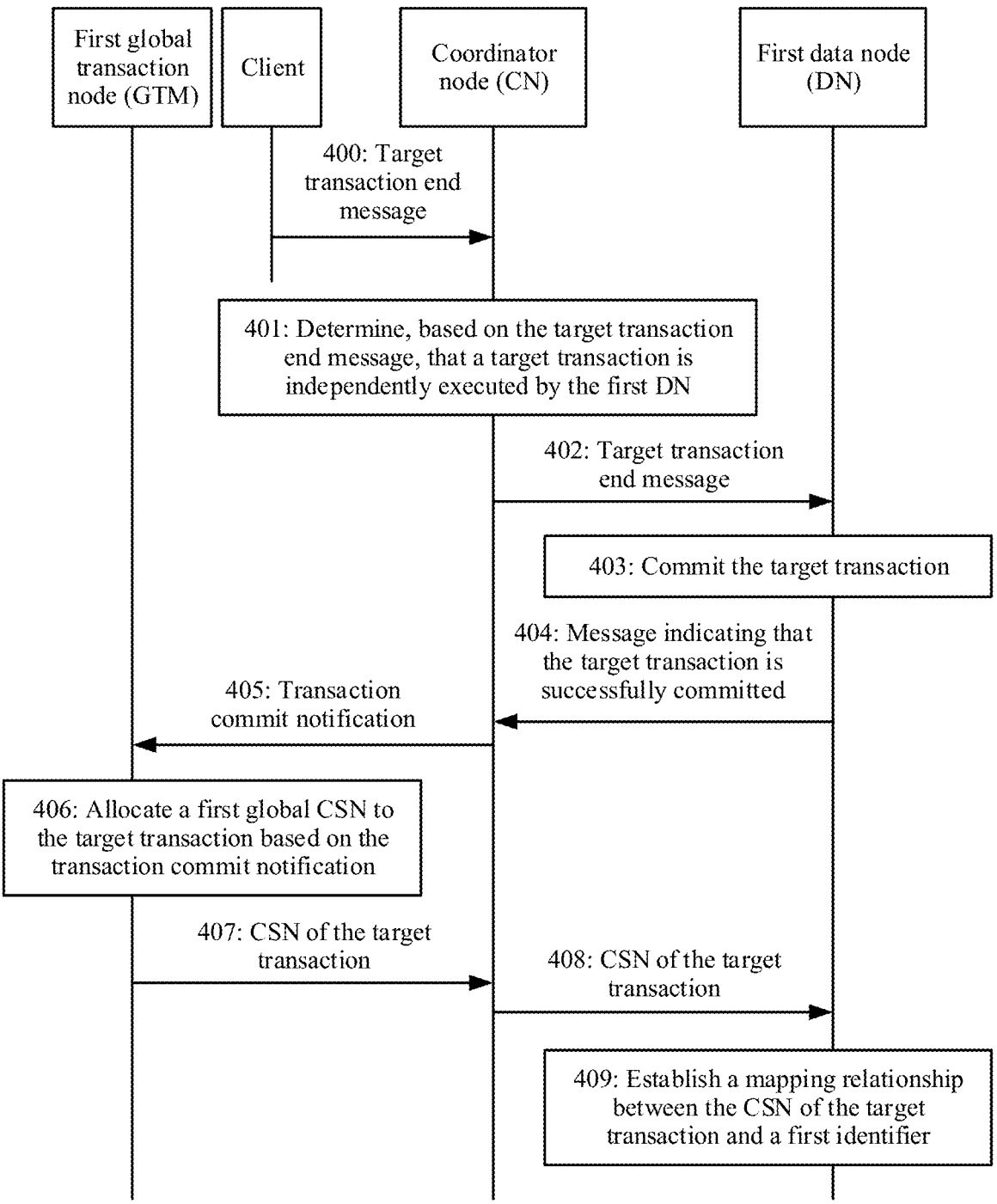
FIG. 8 is a schematic diagram of still another embodiment of a transaction management method according to an embodiment of this application.

2. For a transaction management method obtained after the CN determines that the target transaction is a single-node transaction, refer to FIG. 8.

400: The CN receives a target transaction end message sent by a client.

401: The CN determines, based on the target transaction end message, that the target transaction is independently executed by the first DN.

402: The CN sends the target transaction end message to the first DN.

403: The first DN commits the target transaction.

Committing the target transaction means that the first DN commits the target transaction to a data storage for storage.

Operation 404 to operation 409 are the same as operation 304 to operation 309, and details are not described herein again.

In addition, in this embodiment of this application, the database system further includes the second GTM. The second GTM is configured to back up data of the first GTM. When the first GTM is configured to send the CSN of the target transaction to the CN, the first GTM is configured to send the third global CSN to the second GTM by using the asynchronous thread.

The first GTM maintains only a globally incrementing CSN, and a worker thread in the first GTM corresponds to a request connected from a CN end.

All the foregoing embodiments of the plurality of transaction management methods can reduce network traffic, and improve concurrency and scalability of the database system.

The target transaction end message described in the foregoing embodiment is triggered by the client. Such a transaction that starts with triggering by the client and ends with triggering by the client may be referred to as an "explicit transaction". Actually, the database system may also manage an "implicit transaction". The implicit transaction refers to a transaction that starts with triggering by the CN and ends with triggering by the CN.

In addition, the database system may further periodically clear dirty data. The dirty data may be understood as historical data of a modified transaction ID, and is invisible to the client.

A dirty data cleaning process may be understood as follows: Each DN in the database system sends a smallest CSN held by the DN to the CN, and the CN determines a global clean value based on the smallest CSN held by all DNs. The global clean value is a smallest CSN in CSNs held by all the DNs. The CN sends the global clean value to the first DN. The first DN receives the global clean value sent by the CN, and cleans up the dirty data based on the global clean value. It should be noted that when the first GTM maintains the CSN by decrementing the CSN, the global clean value is a largest CSN in the CSNs held by all the DNS.

In this embodiment, the first GTM does not need to participate in data cleaning. The CN initiates collection of the global clean value. The CN indicates the first DN to periodically clean the dirty data based on the global clean value. The dirty data may be understood as the historical data of the modified transaction ID, and is invisible to the client. In this dirty data cleaning solution, load of the first GTM can be reduced, and performance of the first GTM can be improved.

To facilitate description of an effect difference between the improved solution in this embodiment of this application and the conventional technology, engineering personnel perform a test, and record data in the following Table 1.

TABLE 1

|  | 4CN 8DN | 16CN 32DN | 32CN 64DN |
| --- | --- | --- | --- |
| Original GTM mode | 800000 | 800000 | 800000 |
| GTM mode of this application | 1600000 | 6500000 | 17000000 |

In Table 1, in a database system including four CNs and eight DNs, if an original GTM mode is used, the GTM can process 800000 transactions per minute. If the GTM mode in this application is used, the GTM can process 1600000 transactions per minute. In a database system including 16 CNs and 32 DNs, if an original GTM mode is used, the GTM can process 800000 transactions per minute. If the GTM mode in this application is used, the GTM can process 6500000 transactions per minute. In a database system including 32 CNs and 64 DNs, if an original GTM mode is used, the GTM can process 800000 transactions per minute. If the GTM mode in this application is used, the GTM can process 17000000 transactions per minute. It can be learned from data comparison in Table 1 that, in the original GTM mode, as quantities of CNs and DNs increases, overall throughput of a cluster does not increase, and an entire GTM mode restricts performance upper limit of the cluster. After the GTM mode in this application is used, the GTM processing performance is greatly optimized. As a quantity of nodes increases, the overall performance and the throughput of the cluster can be linearly expanded.

The foregoing plurality of embodiments describe the database system and the transaction management method. The following describes a transaction management apparatus provided in embodiments of this application with reference to the accompanying drawings.

Figure 9:
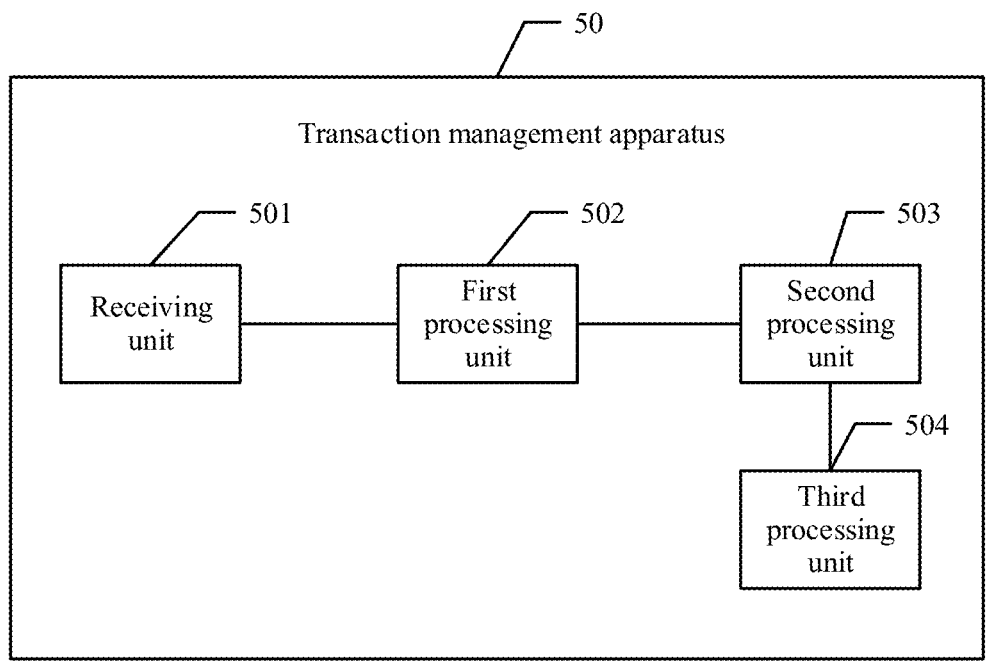
FIG. 9 is a schematic diagram of an embodiment of a transaction management apparatus according to an embodiment of this application.

As shown in FIG. 9, a transaction management apparatus 50 provided in an embodiment of this application is a first data node DN in the foregoing database system. The database system further includes a first global transaction manager GTM and a coordinator node CN. The apparatus 50 includes the following.

A receiving unit 501 is configured to receive a query sent by the CN.

A first processing unit 502 is configured to: in response to the query received by the receiving unit 501, determine a target commit sequence number CSN. The target CSN is allocated by the first GTM. The target CSN is used to distinguish between a committed transaction and an active transaction on the first DN. The active transaction is a transaction that is being executed.

A second processing unit 503 is configured to determine the committed transaction on the first DN based on the target CSN determined by the first processing unit 502.

A third processing unit 504 is configured to determine, based on the committed transaction determined by the second processing unit 503, a query result corresponding to the query.

The apparatus provided in this embodiment of this application may determine the committed transaction by comparing CSNs. Compared with determining the committed transaction by the first DN by using an active transaction linked list, a calculation amount can be reduced. This helps improve concurrency and scalability of the database system.

Optionally, the receiving unit 501 is further configured to receive a CSN that is of the target transaction and that is sent by the CN.

The first processing unit 502 is further configured to store a mapping relationship between the CSN of the target transaction and a first identifier. The first identifier is a local transaction identifier of the target transaction on the first DN.

Optionally, the database system further includes a second DN. The target transaction is jointly executed by the first DN and the second DN. The receiving unit 501 is further configured to: receive, before receiving the CSN that is of the target transaction and that is sent by the CN, a global identifier that is of the target transaction and that is sent by the CN. The global identifier includes an identifier of the second DN and a second identifier. The second identifier is a local transaction identifier of the target transaction on the second DN.

The first processing unit 502 is further configured to determine, based on the global identifier, the second DN that jointly executes the target transaction.

Optionally, the query is related to at least two DNs including the first DN. The receiving unit 501 is further configured to receive the target CSN sent by the CN. The target CSN is a second global CSN allocated by the first GTM when the first GTM receives a snapshot request.

Optionally, the query is related only to the first DN. The receiving unit 501 is further configured to receive a single-node identifier sent by the CN.

The second processing unit 503 is configured to obtain the target CSN from a local cache of the first DN based on the single-node identifier. The target CSN is a CSN allocated by the first GTM to a last transaction committed by the first DN.

Optionally, the second processing unit 503 is configured to determine that a transaction whose CSN is not greater than the target CSN is the committed transaction. Alternatively, the second processing unit 503 determines that a transaction whose CSN is not less than the target CSN is the committed transaction.

Optionally, the apparatus may further include a sending unit. The sending unit may send, to the CN, a smallest CSN held by the first DN. The smallest CSN is used by the CN to determine a global clean value. The global clean value is a smallest CSN in CSNs held by all the DNs.

The receiving unit 501 is further configured to receive the global clean value sent by the CN.

The first processing unit 502 is configured to clean dirty data based on the global clean value.

For related content of the transaction management apparatus 50, refer to related content of the first DN in the foregoing method embodiment. Details are not described herein again.

Figure 10:
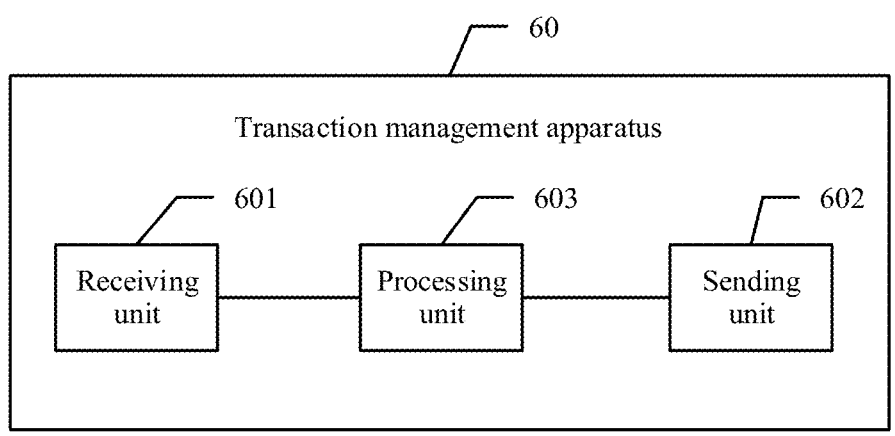
FIG. 10 is a schematic diagram of another embodiment of a transaction management apparatus according to an embodiment of this application.

As shown in FIG. 10, a transaction management apparatus 60 provided in an embodiment of this application is the first global transaction manager GTM in the foregoing database system. The database system further includes a first data node DN and a coordinator node CN. The apparatus includes a receiving unit 601, a sending unit 602, and a processing unit 603.

The receiving unit 601 is configured to receive a snapshot request sent by the CN.

The sending unit 602 is configured to send a target commit sequence number CSN to the CN based on the snapshot request. The target CSN is a second global CSN allocated by the first GTM when the first GTM receives the snapshot request. The target CSN is used by the first DN to determine a committed transaction on the first DN.

The transaction management apparatus 60 provided in this embodiment of this application needs to maintain only one globally latest CSN. This not only avoids a lock conflict, but also reduces a calculation amount of searching for a large quantity of active transactions. This helps access more requests. In addition, only one CSN needs to be sent to reduce network traffic. This helps improve concurrency and scalability of the database system.

Optionally, the receiving unit 601 is further configured to receive a transaction commit notification sent by the CN. The transaction commit notification indicates that the target transaction has been committed.

The processing unit 603 is configured to allocate a first global CSN to the target transaction based on the transaction commit notification.

The sending unit 602 is further configured to send a CSN of the target transaction to the CN.

Optionally, the database system further includes a second GTM. The second GTM is configured to back up data of the first GTM.

The sending unit 602 is further configured to: when sending the CSN of the target transaction to the CN, send a third global CSN to the second GTM by using an asynchronous thread. The third global CSN is obtained by the first GTM by incrementing or decrementing the first global CSN.

For related content of the transaction management apparatus 60, refer to related content of the first GTM in the foregoing method embodiment. Details are not described herein again.

Figure 11:
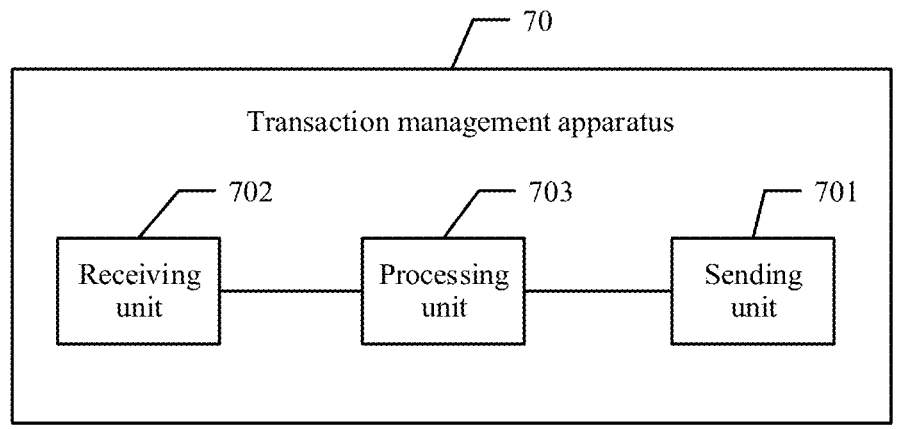
FIG. 11 is a schematic diagram of still another embodiment of a transaction management apparatus according to an embodiment of this application.

As shown in FIG. 11, a transaction management apparatus 70 provided in this embodiment of this application is the coordinator node CN in the foregoing database system. The database system further includes a first global transaction manager GTM and a first data node DN. The apparatus 70 includes a sending unit 701, a receiving unit 702, and a processing unit 703.

The sending unit 701 is configured to send a snapshot request to the first GTM.

The receiving unit 702 is configured to receive a target commit sequence number CSN sent by the first GTM. The target CSN is a second global CSN allocated by the first GTM when the first GTM receives the snapshot request.

The sending unit 701 is configured to send a query and the target CSN to the first DN. The target CSN is used by the first DN to determine a committed transaction on the first DN.

Optionally, the receiving unit 702 is further configured to receive a message that is sent by the first DN and that indicates that a target transaction is successfully committed.

The sending unit 701 is further configured to send a transaction commit notification to the first GTM. The transaction commit notification indicates that the target transaction has been committed.

The receiving unit 702 is further configured to receive a CSN that is of the target transaction and that is sent by the first GTM. The CSN of the target transaction is obtained after the first GTM allocates a first global CSN to the target transaction.

The sending unit 701 is further configured to send the CSN of the target transaction to the first DN. The CSN of the target transaction is used by the first DN to store a mapping relationship between the CSN of the target transaction and a first identifier. The first identifier is a local transaction identifier of the target transaction on the first DN.

Optionally, the database system further includes a second DN. The target transaction is jointly executed by the first DN and the second DN.

The sending unit 701 is further configured to send a global identifier of the target transaction to the first DN. The global identifier includes an identifier of the second DN and a second identifier. The second identifier is a local transaction identifier of the target transaction on the second DN. The global identifier is used by the first DN to determine, based on the global identifier, the second DN that jointly executes the target transaction.

Optionally, the processing unit 703 is further configured to: before the sending unit 701 sends the snapshot request to the first GTM, determine that the query is related to at least two DNs including the first DN.

Optionally, the receiving unit 702 is further configured to receive a smallest CSN held and sent by each global DN.

The processing unit 703 is further configured to determine a global clean value based on the smallest CSN held by each global DN. The global clean value is a smallest CSN in CSNs held by all the DNS.

The sending unit 701 is further configured to send the global clean value to the first DN. The global clean value is used by the first DN to clean dirty data based on the global clean value.

For related content of the transaction management apparatus 70, refer to related content of the CN in the foregoing method embodiments. Details are not described herein again.

Figure 12:
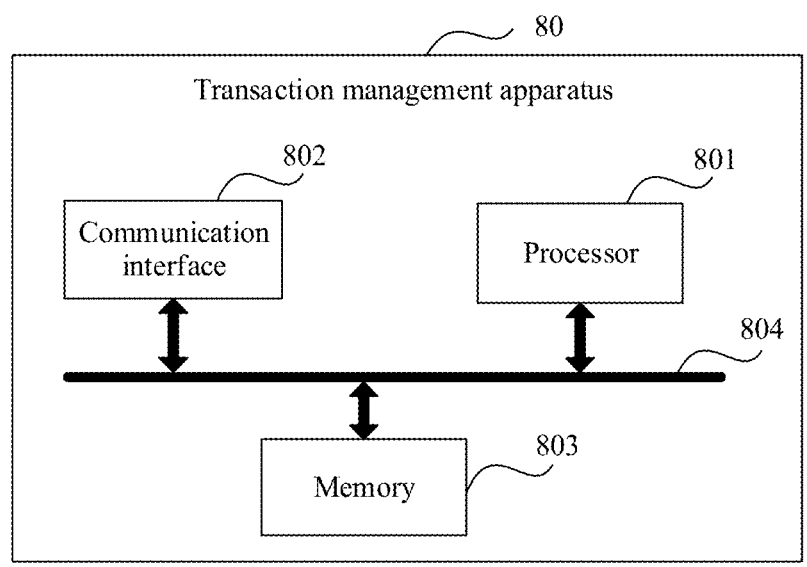
FIG. 12 is a schematic diagram of a structure of a transaction management apparatus according to an embodiment of this application.

FIG. 12 is a schematic diagram of a possible logical structure of a transaction management apparatus 80 in the foregoing embodiment according to an embodiment of this application. The transaction management apparatus 80 includes a processor 801, a communication interface 802, a memory 803, and a bus 804. The first processor 801, the communication interface 802, and the storage system 803 are connected to each other through the bus 804. In this embodiment of this application, the processor 801 is configured to control and manage an action of the transaction management apparatus 80. For example, the processor 801 is configured to perform determining-related operations in FIG. 2 to FIG. 8, for example, operations 104 to 106, operations 202 to 204, operations 301, 303, 306, and 309, and operations 401, 403, 406, and 409. The communication interface 802 is configured to support the transaction management apparatus 80 in performing communication. For example, the communication interface 802 may perform operations related to receiving or sending in the foregoing method embodiments. The memory 803 is configured to store program code and data of the transaction management apparatus 80.

The processor 801 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 804 may be a peripheral component interconnect (PCI) bus, an extended industry standard architecture (EISA) bus, or the like. Buses may be classified into an address bus, a data bus, a control bus, and the like. For ease of representation, only one bold line is used to represent the bus in FIG. 11, but this does not mean that there is only one bus or only one type of bus.

Figure 13:
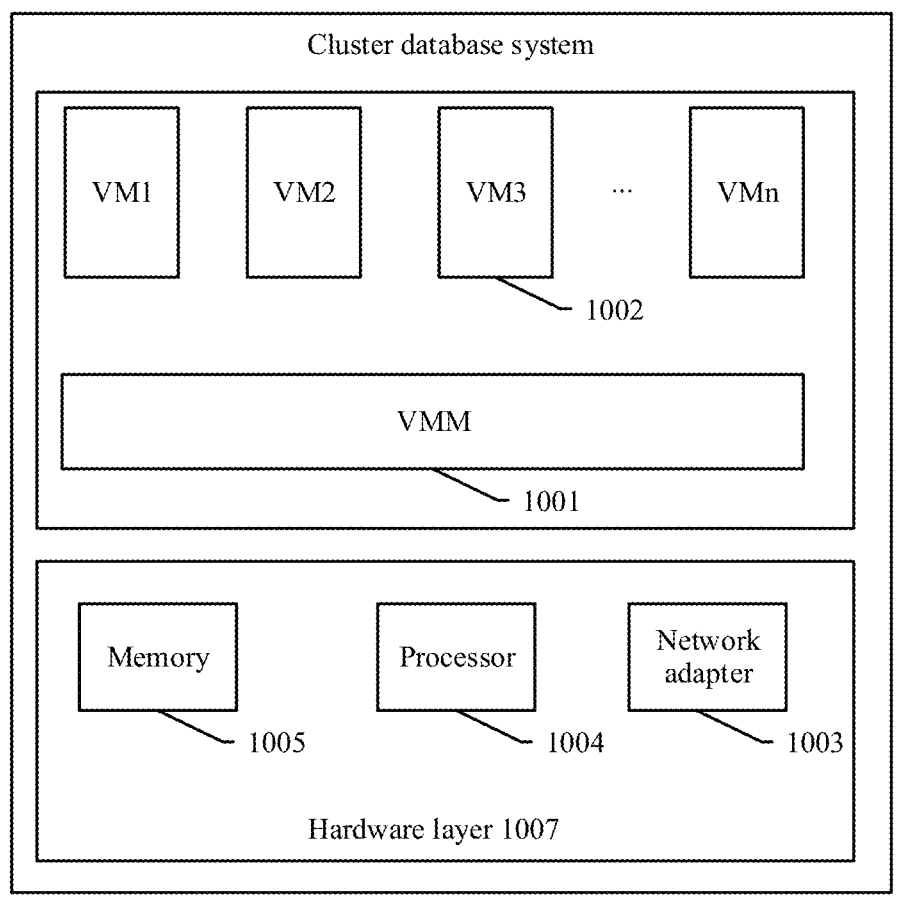
FIG. 13 is another schematic diagram of a structure of a database system according to an embodiment of this application.

Refer to FIG. 13. An embodiment of the present invention further provides a distributed database system, including a hardware layer 1007, a virtual machine monitor (VMM) 1001 running on the hardware layer 1007, and a plurality of virtual machines 1002. One virtual machine may be used as a data node of the distributed database system. Optionally, one virtual machine may be further specified as a coordinator node.

Specifically, the virtual machine 1002 is a virtual computer simulated on a common hardware resource by using virtual machine software. An operating system and an application program may be installed on the virtual machine, and the virtual machine may further access a network resource. For application programs running on the virtual machines, the virtual machines work like real computers.

The hardware layer 1007 is a hardware platform for virtual environment running, and may be obtained by abstracting hardware resources of one or more physical machines. The hardware layer may include a plurality of types of hardware, for example, a processor 1004 (such as a CPU) and a storage 1005, and may further include a network adapter 1003 (such as an RDMA network adapter), a high-speed/low-speed input/output (I/O) device, and another device with a specific processing function.

The virtual machine 1002 runs an executable program based on the VMM and a hardware resource provided by the hardware layer 1007, to implement some or all functions of the transaction management apparatus in the related embodiments in FIG. 2 to FIG. 8. For brevity, details are not described herein.

Further, the distributed database system may further include a host. The host, serving as a management layer, is configured to manage and allocate hardware resources, present a virtual hardware platform for the virtual machine, and implement scheduling and isolation for the virtual machine. The host may be a virtual machine monitor (VMM) or a combination of a VMM and one privileged virtual machine. The virtual hardware platform provides various hardware resources for each virtual machine running on the virtual hardware platform. For example, the virtual hardware platform provides a virtual processor (such as a VCPU), a virtual memory, a virtual disk, and a virtual network adapter. The virtual disk may be corresponding to a file or a logic block device of the host. A virtual machine runs on a virtual hardware platform that is prepared by the host for the virtual machine, and one or more virtual machines run on the host. The VCPU of the virtual machine 1002 executes the executable program stored in the virtual memory corresponding to the VCPU, to implement or execute the method operations described in the foregoing method embodiments of the present invention. For example, some or all functions of the transaction management apparatus in the related embodiments in FIG. 2 to FIG. 8 are implemented.

Another embodiment of this application further provides a computer-readable storage medium. The computer-readable storage medium stores computer-executable instructions. When at least one processor of a device executes the computer-executable instructions, the device performs the transaction management method described in the embodiments in FIG. 2 to FIG. 8.

Another embodiment of this application further provides a computer program product. The computer program product includes computer-executable instructions, and the computer-executable instructions are stored in a computer-readable storage medium. At least one processor of a device may read the computer-executable instructions from the computer-readable storage medium. When the at least one processor executes the computer-executable instructions, the device performs the transaction management method described in embodiments in FIG. 2 to FIG. 8.

Another embodiment of this application further provides a chip system. The chip system includes a processor, configured to support the transaction management apparatus to implement the transaction management method described in the embodiments in FIG. 2 to FIG. 8. In a possible design, the chip system may further include a memory. The memory is configured to store program instructions and data that are necessary for the transaction management apparatus. The chip system may include a chip, or may include a chip and another discrete component.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the embodiment goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in embodiments of this application, it should be understood that the disclosed system, apparatus, and method may be implemented in other manners. For example, the described apparatus embodiment is merely an example. For example, division into the units is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the method described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A database system comprising at least one processor, the database system comprising:
    a coordinator node (CN) configured to send a query to a first data node (DN); and
    the first DN configured to: in response to the query, determine a target commit sequence number (CSN), determine a committed transaction on the first DN based on the target CSN, and determine, based on the committed transaction, a query result corresponding to the query, wherein the target CSN is allocated by the first global transaction manager (GTM), the target CSN distinguishes between the committed transaction and an active transaction on the first DN, and the active transaction is a transaction that is being executed;
    the CN is configured to: receive a message sent by the first DN that indicates that a target transaction is successfully committed, and in response to the message, send a transaction commit notification to the first GTM that indicates that the target transaction has been committed;
    the first GTM is configured to: allocate a first global CSN to the target transaction based on the transaction commit notification, and send a CSN of the target transaction to the CN;
    the CN is configured to send the CSN of the target transaction to the first DN; and
    the first DN is configured to store a mapping relationship between the CSN of the target transaction and a first identifier, wherein the first identifier is a local transaction identifier of the target transaction on the first DN;
    wherein the database system further comprises a second GTM, and the second GTM is configured to back up data of the first GTM;
    the first GTM is configured to: when sending the CSN of the target transaction to the CN, send a third global CSN to the second GTM by using an asynchronous thread, wherein the third global CSN is obtained by the first GTM by incrementing or decrementing the first global CSN.

2. The database system according to claim 1, wherein the database system further comprises a second DN, and the target transaction is jointly executed by the first DN and the second DN;
    the CN is configured to send a global identifier of the target transaction to the first DN, wherein the global identifier comprises an identifier of the second DN and a second identifier, and the second identifier is a local transaction identifier of the target transaction on the second DN; and
    the first DN is configured to determine, based on the global identifier, the second DN that jointly executes the target transaction.

3. The database system according to claim 1, wherein the CN is further configured to: before sending the query to the first DN, determine that the query is related to at least two DNs comprising the first DN; send a snapshot request to the first GTM; receive the target CSN sent by the first GTM, wherein the target CSN is a second global CSN allocated by the first GTM when the first GTM receives the snapshot request; and send the target CSN to the first DN.

4. The database system according to claim 1, wherein the CN is further configured to: before sending the query to the first DN, determine that the query is related to only the first DN, and send a single-node identifier to the first DN; and
    the first DN is configured to obtain the target CSN from a local cache of the first DN based on the single-node identifier, wherein the target CSN is a CSN allocated by the first GTM to a latest transaction committed by the first DN.

5. The database system according to claim 1, wherein that the first DN is configured to determine the committed transaction based on the target CSN comprises:
    the first DN is configured to determine that a transaction whose CSN is not greater than the target CSN is the committed transaction; or
    the first DN is configured to determine that a transaction whose CSN is not less than the target CSN is the committed transaction.

6. A transaction management method in a database system, comprising:
    receiving, by a first data node (DN) in the database system, a query sent by a coordinator node (CN) in the database system;
    in response to the query, determining, by the first DN, a target commit sequence number (CSN), wherein the target CSN is allocated by a first global transaction manager (GTM) in the database system, the target CSN distinguishes between a committed transaction and an active transaction on the first DN, and the active transaction is a transaction that is being executed;
    determining, by the first DN, the committed transaction on the first DN based on the target CSN; and
    determining, by the first DN based on the committed transaction, a query result corresponding to the query;
    wherein the query is related to only the first DN, and the method further comprises:
    receiving, by the first DN, a single-node identifier sent by the CN; and
    the determining, by the first DN, the committed transaction based on the target CSN comprises:
    obtaining, by the first DN, the target CSN from a local cache of the first DN based on the single-node identifier, wherein the target CSN is a CSN allocated by the first GTM to a latest transaction committed by the first DN.

7. The method according to claim 6, wherein the method further comprises:
    receiving, by the first DN, a CSN that is of a target transaction and that is sent by the CN; and
    storing, by the first DN, a mapping relationship between the CSN of the target transaction and a first identifier that is a local transaction identifier of the target transaction on the first DN.

8. The method according to claim 7, wherein the database system further comprises a second DN, and the target transaction is jointly executed by the first DN and the second DN, and the method further comprises:
    receiving, by the first DN, a global identifier that is of the target transaction and that is sent by the CN, wherein the global identifier comprises an identifier of the second DN and a second identifier, and the second identifier is a local transaction identifier of the target transaction on the second DN; and determining, by the first DN based on the global identifier, the second DN that jointly executes the target transaction.

9. The method according to claim 6, wherein the query is related to at least two DNs comprising the first DN, and the method further comprises:

receiving, by the first DN, the target CSN sent by the CN, wherein the target CSN is a second global CSN allocated by the first GTM when the first GTM receives a snapshot request.

10. The method according to claim 6, wherein the determining, by the first DN, the committed transaction based on the target CSN comprises:

determining, by the first DN, that a transaction whose CSN is not greater than the target CSN is the committed transaction; or determining, by the first DN, that a transaction whose CSN is not less than the target CSN is the committed transaction.

11. A transaction management method in a database system, comprising:

receiving, by a first global transaction manager (GTM) in the database system, a snapshot request sent by a coordinator node (CN) in the database system; and sending, by the first GTM, a target commit sequence number (CSN) to the CN based on the snapshot request, wherein the target CSN is a second global CSN allocated by the first GTM when the first GTM receives the snapshot request, and the target CSN is used by a first data node (DN) in the database system to determine a committed transaction on the first DN;

receiving, by the CN, a message sent by the first DN that indicates that a target transaction is successfully committed, and in response to the message, sending, by the CN, a transaction commit notification to the first GTM that indicates that the target transaction has been committed;

allocating, by the first GTM, a first global CSN to the target transaction based on the transaction commit notification, and sending, by the first GTN, a CSN of the target transaction to the CN;

sending, by the CN, the CSN of the target transaction to the first DN; and storing, by the DN, a mapping relationship between the CSN of the target transaction and a first identifier, wherein the first identifier is a local transaction identifier of the target transaction on the first DN;

wherein the database system further comprises a second GTM, and the second GTM is configured to back up data of the first GTM; and when the first GTM sends the CSN of the target transaction to the CN, sending, by the first GTM, a third global CSN to the second GTM using an asynchronous thread, wherein the third global CSN is obtained by the first GTM by incrementing or decrementing the first global CSN.

12. The method according to claim 11, wherein the method further comprises:

receiving, by the first GTM, a transaction commit notification sent by the CN, wherein the transaction commit notification indicates that a target transaction has been committed; and allocating, by the first GTM, a first global CSN to the target transaction based on the transaction commit notification, and sending a CSN of the target transaction to the CN.

13. A transaction management method in a database system, comprising:

sending, by a coordinator node (CN) in the database system, a snapshot request to a first global transaction manager (GTM) in the database system;

receiving, by the CN, a target commit sequence number (CSN) sent by the first GTM, wherein the target CSN is a second global CSN allocated by the first GTM when the first GTM receives the snapshot request; and sending, by the CN, a query and the target CSN to a first data node (DN) in the database system, wherein the target CSN is used by the first DN to determine a committed transaction on the first DN;

receiving, by the CN, a message sent by the first DN that indicates that a target transaction is successfully committed, and in response to the message, sending, by the CN, a transaction commit notification to the first GTM that indicates that the target transaction has been committed;

allocating, by the first GTM, a first global CSN to the target transaction based on the transaction commit notification, and sending, by the first GTM, a CSN of the target transaction to the CN;

sending, by the CN, the CSN of the target transaction to the first DN; and storing, by the first DN, a mapping relationship between the CSN of the target transaction and a first identifier, wherein the first identifier is a local transaction identifier of the target transaction on the first DN;

wherein the database system further comprises a second GTM, and the second GTM is configured to back up data of the first GTM; and when the first GTM sends the CSN of the target transaction to the CN, sending, by the first GTM, a third global CSN to the second GTM using an asynchronous thread, wherein the third global CSN is obtained by the first GTM by incrementing or decrementing the first global CSN.

14. The method according to claim 13, wherein the method further comprises:

receiving, by the CN, a message that is sent by the first DN and that indicates that a target transaction is successfully committed;

in response to the message, sending, by the CN, a transaction commit notification to the first GTM, wherein the transaction commit notification indicates that the target transaction has been committed;

receiving, by the CN, a CSN that is of the target transaction and that is sent by the first GTM, wherein the CSN of the target transaction is a first global CSN allocated by the first GTM; and sending, by the CN, the CSN of the target transaction to the first DN, wherein the CSN of the target transaction is used by the first DN to store a mapping relationship between the CSN of the target transaction and a first identifier, and the first identifier is a local transaction identifier of the target transaction on the first DN.

15. The method according to claim 14, wherein the database system further comprises a second DN, the target transaction is jointly executed by the first DN and the second DN, and the method further comprises:

sending, by the CN, a global identifier of the target transaction to the first DN, wherein the global identifier comprises an identifier of the second DN and a second identifier, the second identifier is a local transaction identifier of the target transaction on the second DN, and the global identifier is used by the first DN to determine, based on the global identifier, the second DN that jointly executes the target transaction.

16. The method according to claim 13, wherein the method further comprises:
   before sending the snapshot request to the first GTM, determining, by the CN, that the query is related to at least two DNs comprising the first DN.

\* \* \* \* \*